US008251801B2

(12) United States Patent

Wadds et al.

(10) Patent No.: US 8,251,801 B2
(45) Date of Patent: Aug. 28, 2012

(54) AUTOMATED TABLE CHIP-CHANGE SCREEN FEATURE

(75) Inventors: Nathan J. Wadds, Waverley (AU); Bradbury C T Glencross, Forresters Beach (AU)

(73) Assignee: Shuffle Master, Inc., Las Vegas, NV (US)

( * ) Notice: Subject to any disclaimer, the term of this patent is extended or adjusted under 35 U.S.C. 154(b) by 959 days.

(21) Appl. No.: 12/231,759

(22) Filed: Sep. 5, 2008

(65) Prior Publication Data

US 2010/0062845 A1 Mar. 11, 2010

(51) Int. Cl.
*A63F 13/00* (2006.01)
*A63F 1/18* (2006.01)

(52) U.S. Cl. ................ 463/25; 463/13; 463/16; 463/17; 463/29; 273/138.1; 273/139; 273/274; 273/292

(58) Field of Classification Search .............. 463/10–13, 463/16–22, 25–29, 40–42; 273/138.1, 139, 273/142 B, 142 A, 142 J, 148 A, 148 R, 148 B, 273/149 P, 149 R, 274, 292–293, 304, 306, 273/309; *A63F 13/00, 1/18*
See application file for complete search history.

(56) References Cited

U.S. PATENT DOCUMENTS

| | | | |
|---|---|---|---|
| 1,831,580 | A | 11/1931 | Stecker |
| 2,023,210 | A | 12/1935 | Potter |
| 2,666,645 | A | 1/1954 | Phillips |
| 3,222,071 | A | 12/1965 | Lang |
| 3,735,982 | A | 5/1973 | Gerfin |
| 3,810,627 | A | 5/1974 | Levy |
| 3,876,208 | A | 4/1975 | Wächtler et al. |
| 3,909,002 | A | 9/1975 | Levy |
| 4,339,798 | A | 7/1982 | Hedges et al. |
| 4,467,424 | A | 8/1984 | Hedges et al. |
| 4,497,488 | A | 2/1985 | Plevyak et al. |
| 4,531,187 | A | 7/1985 | Uhland |
| 4,534,562 | A | 8/1985 | Cuff et al. |

(Continued)

FOREIGN PATENT DOCUMENTS

WO WO 97/38366 10/1997

OTHER PUBLICATIONS

Nevada State Certificate of Registration for Trademark SAFEJACK to Mikohn Gaming Corporation of Las Vegas, Nevada dated Sep. 4, 1997.

(Continued)

*Primary Examiner* — Arthur O. Hall
(74) *Attorney, Agent, or Firm* — TraskBritt

(57) ABSTRACT

A system for playing a live game of chance using electronic wagering and enabling player-initiated change of denomination of virtual chips is disclosed. The system uses a gaming table equipped with a card-reading apparatus and multiple dual mode player/dealer displays, each with a player interface. Physical playing cards are electronically read and delivered to the casino table. Electronic information of at least one of rank and count is provided to a game processor. The game processor also sends and receives player information to and from a player display. The player display is divided into two segments, the first segment displaying player information and a second segment displaying dealer information. The player enters wagers and other play decisions through the player interface. The system displays information useful to the player on the first segment and information useful to the dealer on the second segment at appropriate intervals.

22 Claims, 31 Drawing Sheets

U.S. PATENT DOCUMENTS

| | | | | |
|---|---|---|---|---|
| 4,614,342 | A | 9/1986 | Takashima | |
| 4,711,371 | A | 12/1987 | Harrigan | |
| 4,743,022 | A | 5/1988 | Wood | |
| 4,750,743 | A | 6/1988 | Nicoletti | |
| 4,755,941 | A | 7/1988 | Bacchi | |
| 4,760,527 | A | 7/1988 | Sidley | |
| 4,805,907 | A | 2/1989 | Hagiwara | |
| 4,926,327 | A | 5/1990 | Sidley | |
| 4,948,134 | A | 8/1990 | Suttle et al. | |
| 4,973,951 | A | 11/1990 | Shigeta et al. | |
| 5,022,653 | A | 6/1991 | Suttle et al. | |
| 5,033,744 | A | 7/1991 | Bridgeman et al. | |
| 5,067,713 | A | 11/1991 | Soules et al. | |
| 5,224,706 | A | 7/1993 | Bridgeman et al. | |
| 5,265,882 | A | 11/1993 | Malek | |
| 5,277,424 | A | 1/1994 | Wilms | |
| 5,288,081 | A | 2/1994 | Breeding | |
| 5,299,803 | A | 4/1994 | Halaby | |
| 5,308,065 | A | 5/1994 | Bridgeman et al. | |
| 5,326,104 | A | 7/1994 | Pease et al. | |
| 5,328,189 | A | 7/1994 | Malek | |
| 5,356,140 | A | 10/1994 | Dabrowski et al. | |
| 5,374,061 | A | 12/1994 | Albrecht | |
| 5,395,120 | A | 3/1995 | Malek | |
| 5,411,257 | A | 5/1995 | Fulton | |
| 5,411,270 | A | 5/1995 | Naka et al. | |
| 5,437,451 | A | 8/1995 | Fulton | |
| 5,437,462 | A | 8/1995 | Breeding | |
| 5,586,766 | A | 12/1996 | Forte et al. | |
| 5,586,936 | A | 12/1996 | Bennett et al. | |
| 5,586,937 | A | 12/1996 | Menashe | |
| 5,591,081 | A | 1/1997 | Suzuki | |
| 5,605,334 | A | 2/1997 | McCrea, Jr. | |
| 5,688,174 | A | 11/1997 | Kennedy | |
| 5,707,287 | A | 1/1998 | McCrea, Jr. | |
| 5,722,893 | A | 3/1998 | Hill et al. | |
| 5,735,525 | A | 4/1998 | McCrea, Jr. | |
| 5,770,533 | A | 6/1998 | Franchi | |
| 5,779,546 | A | 7/1998 | Meissner et al. | |
| 5,803,809 | A | 9/1998 | Yoseloff | |
| 5,806,855 | A * | 9/1998 | Cherry | 273/292 |
| 5,823,879 | A | 10/1998 | Goldberg et al. | |
| 5,911,626 | A | 6/1999 | McCrea, Jr. | |
| 5,941,769 | A | 8/1999 | Order | |
| 5,975,528 | A | 11/1999 | Halaby | |
| 6,039,650 | A | 3/2000 | Hill | |
| 6,093,103 | A | 7/2000 | McCrea, Jr. | |
| 6,117,012 | A | 9/2000 | McCrea, Jr. | |
| 6,165,069 | A | 12/2000 | Sines et al. | |
| 6,254,484 | B1 | 7/2001 | McCrea, Jr. | |
| 6,270,404 | B2 | 8/2001 | Sines et al. | |
| 6,293,864 | B1 * | 9/2001 | Romero | 463/12 |
| 6,299,536 | B1 | 10/2001 | Hill | |
| 6,319,122 | B1 | 11/2001 | Packes, Jr. et al. | |
| 6,343,989 | B1 | 2/2002 | Wood et al. | |
| 6,346,044 | B1 | 2/2002 | McCrea, Jr. | |
| 6,386,973 | B1 | 5/2002 | Yoseloff | |
| 6,517,436 | B2 | 2/2003 | Soltys et al. | |
| 6,582,301 | B2 | 6/2003 | Hill | |
| 6,626,757 | B2 | 9/2003 | Oliveras | |
| 6,638,161 | B2 | 10/2003 | Soltys et al. | |
| 6,651,985 | B2 | 11/2003 | Sines et al. | |
| 6,659,866 | B2 | 12/2003 | Frost et al. | |
| 6,676,517 | B2 | 1/2004 | Beavers | |
| 6,722,974 | B2 | 4/2004 | Sines et al. | |
| 6,921,337 | B1 | 7/2005 | Kennedy et al. | |
| 6,939,224 | B2 | 9/2005 | Palmer et al. | |
| 7,008,324 | B1 | 3/2006 | Johnson et al. | |
| 7,048,629 | B2 | 5/2006 | Sines et al. | |
| 7,201,655 | B2 | 4/2007 | Walker et al. | |
| 7,201,661 | B2 | 4/2007 | Kennedy et al. | |
| 7,255,351 | B2 | 8/2007 | Yoseloff et al. | |
| 7,255,642 | B2 | 8/2007 | Sines et al. | |
| 7,316,615 | B2 | 1/2008 | Soltys et al. | |
| 7,374,170 | B2 | 5/2008 | Grauzer et al. | |
| 7,699,695 | B2 * | 4/2010 | White et al. | 463/13 |
| 2003/0224854 | A1 | 12/2003 | Joao | |
| 2004/0003395 | A1 | 1/2004 | Srinivas et al. | |
| 2004/0185933 | A1 | 9/2004 | Nicely | |
| 2004/0229682 | A1 | 11/2004 | Gelinotte | |
| 2005/0164759 | A1 | 7/2005 | Smith et al. | |
| 2005/0242500 | A1 | 11/2005 | Downs, III et al. | |
| 2005/0272501 | A1 | 12/2005 | Tran et al. | |
| 2006/0030400 | A1 | 2/2006 | Mathis | |
| 2006/0058092 | A1 * | 3/2006 | Crawford et al. | 463/13 |
| 2006/0234796 | A1 | 10/2006 | Nobrega et al. | |
| 2006/0279040 | A1 | 12/2006 | Downs, III et al. | |
| 2006/0281537 | A1 | 12/2006 | Abbott et al. | |
| 2007/0029731 | A1 | 2/2007 | Barker | |
| 2007/0072682 | A1 * | 3/2007 | Crawford et al. | 463/46 |
| 2007/0149283 | A1 * | 6/2007 | Poh et al. | 463/37 |
| 2007/0256111 | A1 | 11/2007 | Medford et al. | |
| 2007/0275762 | A1 | 11/2007 | Aaltone et al. | |
| 2008/0006996 | A1 | 1/2008 | Frankel et al. | |
| 2008/0006998 | A1 | 1/2008 | Grauzer et al. | |
| 2008/0037628 | A1 | 2/2008 | Boyce et al. | |
| 2008/0113783 | A1 | 5/2008 | Czyzewski et al. | |
| 2008/0176617 | A1 * | 7/2008 | Kekempanos et al. | 463/13 |
| 2009/0017888 | A1 * | 1/2009 | Kuhn et al. | 463/13 |
| 2009/0098932 | A1 | 4/2009 | Longway | |
| 2009/0115133 | A1 * | 5/2009 | Kelly et al. | 273/274 |
| 2009/0118006 | A1 * | 5/2009 | Kelly et al. | 463/31 |
| 2009/0280904 | A1 * | 11/2009 | Nicely et al. | 463/40 |
| 2009/0286585 | A1 * | 11/2009 | Walker | 463/17 |

OTHER PUBLICATIONS

International Search Report and Written Opinion for PCT/US2009/055665 for Automated Table Chip-Change Screen Feature, Dec. 3, 2009.

Washington State Gambling Commission Study session Agenda; Charitable Nonprofit Operators; Sep. 14, 2006.

* cited by examiner

FIGURE 20A
How To Play
Blackjack begins with each player placing a bet in his betting circle after which the dealer will deal each player and himself two cards. If the dealer has an Ace as his up card, you will be offered "Insurance" which pays 2:1 if the dealer's two cards are a blackjack. Once you have either accepted or declined Insurance, the dealer will check his hole card, and if he does not have a blackjack, you may play your hand. The following options are available:
HIT
If you wish to take another card, press the "Hit" button. The dealer will deal you additional cards until you either select "Stand" or bust.
STAND
If you are satisfied with your hand as-is, press the "Stand" button. This indicates that you do not wish to be dealt any additional cards.
DOUBLE DOWN
If you think you will only need one additional card to complete your hand, you may double your bet and be dealt one additional card. This option is only offered on the first two cards and sometimes on the first two cards after splitting. To indicate that you choose this option, press the "Double Down" button.
NEXT PAGE
1
5
25
100
BANKROLL: $ 205.00
BET:
TIP THE DEALER
PAYTABLES
REBET
CLEAR BETS

AUTOMATED TABLE CHIP-CHANGE SCREEN FEATURE

TECHNICAL FIELD

The present invention is directed to a "chipless" gaming table in which wagers are made on player input devices without the use of physical wagering chips on the table during the play of games. The present invention relates to the field of gaming tables having player electronic data entry or input, particularly casino table wagering systems in which wagering is done with electronic wagering in the absence of chips, tokens, currency or coins being placed on a table as the wager, and preferably such a casino table wagering system in which physical playing cards are used in the play of a casino wagering card game on the system.

BACKGROUND

The chipless (and cashless) gaming technology of the present invention is so named because there is no necessity (and generally no capability) for using direct addition of chips or coins or currency by the player as wagering elements in the play of games on the table. Rather, credit is established for each player at each player position to enable wagering by player-exercised data entry (user input) at various stages of the game. The user input may also enable input of player selections in addition to wager amounts and wager types (e.g., on an underlying game, side bets, jackpots, raises, withdrawals and the like).

U.S. Pat. No. 5,779,546 to Meissner et al. describes a system for monitoring a card game. The system includes a dealer information screen for indicating player requests. A display 201*d*-207*d* consisting of a row of three light-emitting diodes (LEDs) is connected to the back of each player's touch screen so as to be visible by the dealer. These LEDs provide instructions to the dealer to advise him of the player's intentions (hold, deal, split, insurance, etc.). The display may be, for example, an LED display and may be positioned on the dealer's side of each player's touch screen (or elsewhere in a location visible to the dealer). The display is utilized as a quick reference source of instructions for the dealer for certain player choices such as: active, inactive, hit, stand, split, etc.

U.S. Pat. No. 7,201,655 to Walker et al. and U.S. Pat. No. 6,319,122 to Packes, Jr., et al. describe systems that evaluate the rate of play of players on a video gaming system and increases awards or payouts or comps to the player based on the rate of play on a video gaming system.

U.S. Pat. No. 7,316,615 to Soltys et al. describes a system for recording the historical events in casino table card games, providing information on numbers of hands played in a period of time by the dealer, and evaluating win/loss percentages for players and dealers.

U.S. Pat. No. 6,676,517 to Beavers discloses a casino table supervision and analysis system in which potential errors or fraud of the dealers is identified by tracking and analyzing electronically input data.

In the play of some video games, such as Odyssey game Phantom Belle Poker (commercially available in 2002), stacks of gaming chips are shown on the screen, and a player inputs wagers through a button panel. When all of the chips "available" on the screen exceed the value of the requested wager, a larger value virtual chip is automatically moved into a displayed virtual "pot" and smaller denomination virtual chips are returned to the player's screen pot as change from the larger chip. Only a single initial wager (ante wager) per game was available.

More interactive player control and apparent player manipulation of chip stacks has been found by applicants to be desirable in the play of card games at chipless tables to simulate player feel of a standard physical casino table environment.

SUMMARY OF THE INVENTION

A system for playing a live card game with electronic wagering is disclosed. Live casino card games are typically played on a standard gaming table surface embossed with the indicia specific to the game being played. The present system comprises a chipless table having multiple game software available. Individual game markings in one embodiment need not be present, although individual casino or other logos may be printed thereon. A dealer, cards, a card-reading device, a game controller, a dealer interface and multiple player credit wagering interfaces are employed to facilitate the game being played. Players interested in playing a live table game sit at a player position at the table, and are required to purchase credit from the dealer to "buy in" to the play session that is displayed as stacks of virtual chips on a touch screen player input device.

The dealer presides over the game, handles all "buy-ins," "cash-outs," and settles all wagers, as well as deals the cards in the game, resolves each game, and interacts with the players playing the game. Players may buy in with chips, or receive chips upon cashing out, but according to the invention, play exclusively with credit. The dealer is a significant parameter in the speed and rate of play in casino games. The technology disclosed herein eliminates dealer error on payouts and increases efficiency.

Players may independently (sua sponte) initiate a change of value of one or more chips. This activity can be initiated through contact with the touch screen by various types of player contact with individual chips, groups of chips (less than all chips in a stack) or stacks of chips of a first denomination. After initial chip contact, there may be a continued contact (e.g., touch and drag) or a separate contact (tap on a first chip value location, lift and tap on a different chip value location). Predetermined activities or sequences of activities will cause an apparent change in at least some chip denominations, changes in virtual sizes of stacks of chips and enable players to provide denominations of chips to themselves for use in virtual wagering from their individual touch screens.

DETAILED DESCRIPTION OF THE INVENTION

Figure 1:
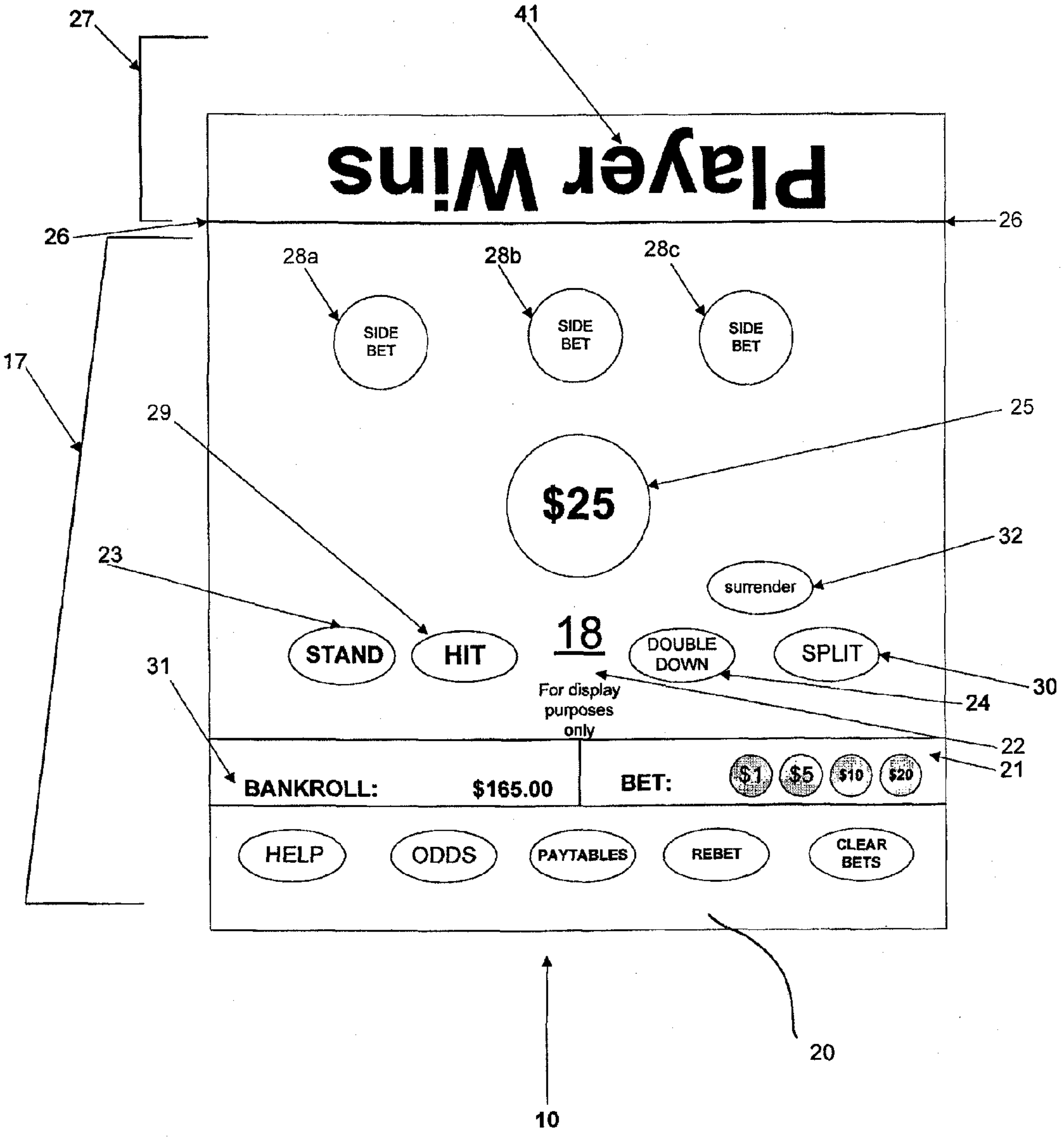
FIG. 1 shows a player display and interface with a dealer area that is displaying a player game outcome in a game of blackjack.

Game profitability is influenced strongly by the speed at which a game is played and the ability to keep players involved in games and to retain players at game sites. The speed of a game is based on the number of hands dealt per hour and the number of wagers settled per hour. Even where games may have a relatively high advantage and percentage held by a casino, if the rate of play is low, then faster games with less-advantageous house odds may produce more revenues. Considering the amount of dealer responsibility in the play of a game, even the very best dealers in the business are slowed down during a game. The time it takes to accurately deal the card game, resolve the card hands in a game, settle all wagers, facilitate cash-outs, resolve disputes and handle buy-ins can quickly accumulate into a substantial and costly time frame. In the casino business, time spent on gaming is money, and when time is not spent playing the games, money is lost.

Most players have developed an interest in casino table games, and especially casino table card games, through play at live tables, with physical chips and physical playing cards. It has been found by applicants to be more desirable to retain as much of the original ambiance and feel of completely live casino table card games while improving the pace of play by removal of delaying elements of the play, such as the dealer's physical activities, including shuffling, chip cashing and other time-consuming events. By mimicking events and features in live casino table card games, without adding back those aspects of the features that can delay play of individual rounds of play of the game, the original feel for the game can be maintained and it is possible that player interest can be retained.

Players may independently (at their own initiative) initiate a change of value of one or more virtual chips displayed on their individual player input screen or their individual region on a shared (player with player or player with dealer) screen region. This activity can be initiated through player contact with the touch screen by various types of player contact with individual virtual chips, groups of virtual chips (less than all virtual chips in a stack) or stacks of virtual chips of a first denomination. After initial virtual chip contact on a touch screen, there may be a continued contact (e.g., touch and drag) or a separate contact (tap on a first virtual chip value location, lift and tap on a different virtual chip value location). Predetermined activities or sequences of activities will cause an apparent change in at least some virtual chip denominations, changes in virtual sizes of stacks of virtual chips and enable players to provide denominations of chips to themselves for use in virtual wagering from their individual touch screens.

Methods and systems according to the present technology may include at least a method for providing player control of wagering on an electronic interface comprising:

a) providing a player with a touch screen monitor player interface;
b) the player touch screen interface in communication with an accounting function in a processor;
c) the touch screen interface showing at least a portion of a player's available credit balance as one or more stacks of virtual chips;
d) the touch screen interface provides at least two separate areas where individual stacks of different value chips may be displayed;

the method comprising:

a player indicating, through contact with the touch screen to the processor, that one first value of chip(s) is to be exchanged for another value of chip(s);

the player indicating with contact of the touch screen a second value for which the one first value of chip is to be exchanged;

the processor identifying a number of second value of chips for which the one chip of a first value is to be exchanged; and the processor reducing displayed numbers of the first value of chips displayed on the touch screen monitor as directed by the player and displaying an increase in number of second value chips on the touch screen monitor corresponding in value to the exchanged first value chip.

A single processor, or multiple processors, may be used and are included in the term "a processor" unless a specific number of processors is noted. The method may either have the player exchanging a larger denomination chip for a greater number of smaller denomination chips or the player exchanging a first number of smaller denomination chips for a second, but smaller, number of larger denomination chips. The player may initiate the exchange by touching on the touch screen a virtual image of the larger denomination chip and dragging the contact to a position on the touch screen where smaller denomination chips are to be positioned in a chip tray. Or, the exchange can be made by touching on the touch screen a virtual image of the smaller denomination chip and dragging the contact to a position on the touch screen where larger denomination chips are to be positioned in a chip tray. The processor determines if sufficient value is present within an image of the smaller denomination of chips, and if sufficient value is determined by the processor to be present, visual imagery on the touch screen of numbers of both the smaller denomination of chips and the larger denomination of chips are correspondingly altered in display of value. Predetermined tap patterns (by way of non-exclusive examples) may include requiring a single tap on each position, a double tap on an originating denomination and a single tap on the receiving denomination, or a single tap on the originating denomination and a double tap on the receiving denomination. The tap patterns may be the same or different for chip exchanges in color-up or color-down (breaking a chip) transactions.

A general description of a system for monitoring the play of a casino card game according to the method of claim 1 may include, by way of non-limiting examples:

a gaming table;

a game controller programmed to administer a casino wagering game on the gaming table;

a plurality of player displays, each display having a first area with the player's touch screen interface for providing a player with game information, wherein each player display includes at least one user interface enabling credit wagering;

a card-reading device for reading at least the rank of a card prior to delivery to a player; and a dealer interface for administering the game.

The system may include a second area on the display for displaying information to the dealer. A dealer touch screen interface is provided and performs functions selected from the group consisting of: player buy in, player cash out, enabling player interface, disabling player interface, transfer credits, dealer log in, dealer log out, notification of a dealer blackjack, and reconciliation of wagers. The system may include a card-handling device with an integrated card-reading device, wherein the card-handling device is selected from the group consisting of a shoe and a shuffler. The system may have at least some of the information displayed in the first area and the second area of the player display is alphanumeric information. The system may include a double-sided display in communication with the game controller, wherein the double-sided display displays first information to players and second information to pit personnel. The player displays may be flush mounted into a top surface of the gaming table and the gaming table may have a fabric covered upper surface, wherein the upper surface lacks game-specific markings.

In the content of the display noted above, the first information to players may be selected from the group consisting of: pay table, game name, casino name, game logo, casino logo and casino advertisement.

In providing a dual function programmable player display, the display may have:

a display screen comprising a first area for displaying player game play information and a second area for displaying player information in a first orientation and dealer information in a second orientation; and touch screen controls in at least the first area enabling players to place wagers, exchange value of displayed virtual chips and input play decisions; and displaying information in the second area for use by a dealer.

The card-reading system may be selected from the group consisting of an overhead card-imaging system and a tabletop card-reading system, and the display may be programmed to enable a dealer to view player cards and set a player hand. The display may also have touch screen controls in the second area and wherein the touch screen controls are used by the dealer to indicate a function selected from the group consisting of: a hand resolution, the identification of a winner, enabling wagering, disabling wagering and to set a hand.

In addition to the time element, there are the issues of accuracy. Sometimes players are paid on wagers that should go to the house, and there are times when players should be paid and their wagers are forfeited to the house. There are times players are given more chips than they paid for, and there are times when players and/or dealers cheat the house by capping and/or pinching wagers.

Therefore, it is desirable to provide a system that facilitates the speed and accuracy of a live card game without disturbing the unique environment a live card game offers players.

Chipless table games operate on credit instead of using traditional gaming chips. Therefore, the need for chips is eliminated, except optionally, for when cashing a customer in or out. The use of the credit based system speeds up game play by eliminating time the dealer would spend exchanging cash for gaming chips, calculating and paying wins, and increasing hands per hour. This also increases revenue for the casino by increasing play and eliminating dealer error in paying out wins to customers.

The use of a chipless gaming table eliminates the cost of purchasing chips. Wager amounts are electronically recorded, eliminating the need for more costly RFID chips and antennas.

Figure 12:
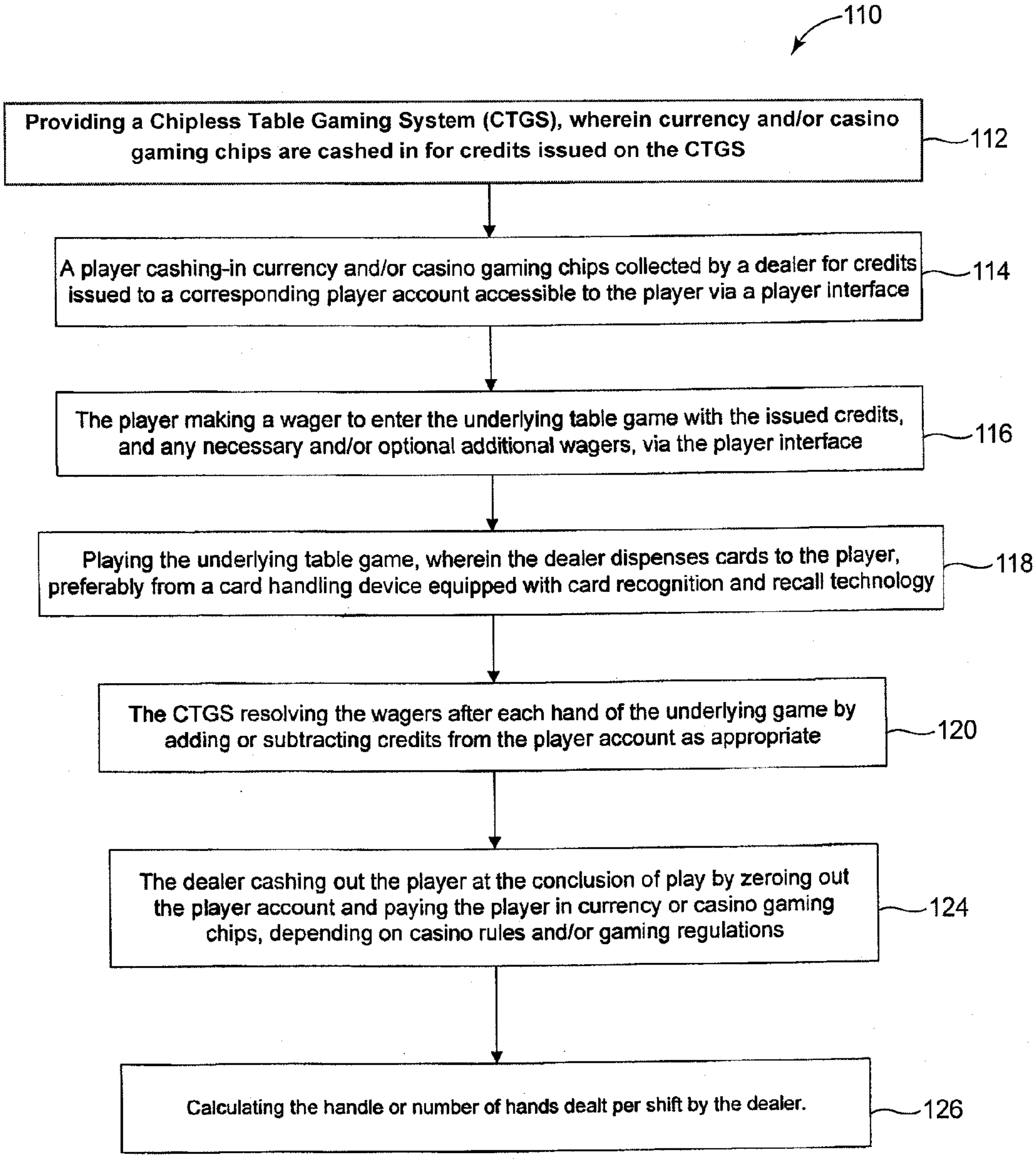
FIG. 12 is a flow diagram of an exemplary process of the present invention.

FIG. 12 is a flow diagram 110 for the method of the present invention. A Chipless Table Gaming System (CTGS) is provided at step 112. The CTGS generally has a dealer station with a dealer interface and a plurality of player stations, each including a player interface, such as a touch screen, and operates with purchased credits instead of casino gaming chips. At step 114, a dealer "cashes in" a player wishing to join the underlying table game by accepting currency or casino gaming chips and issuing credits for a player to wager with to the corresponding player account accessible to the player via the player interface.

At step 116, the player makes a wager to enter the underlying table game using the credits and also makes any other necessary or optional additional wagers to continue play via the player interface. Then, at step 118, the underlying table game proceeds as usual. The dealer dispenses physical cards to the player, preferably from a card-handling device equipped with card recognition and/or hand recall technology. Hand recall information is useful when the game requires a fixed number of cards dealt to each player, and the final hand is determined at the point that the hand is dealt.

Upon conclusion of a hand of play in the underlying game, at step 120, the CTGS automatically resolves the wagers by adding or subtracting credits to the corresponding player accounts as appropriate. The dealer then cashes out the player at step 124, by zeroing out or resetting the player account and paying the player for any winnings or balance on the account in currency or casino gaming chips, depending on casino rules and/or gaming regulations.

At step 126, the CTGS calculates the handle or number of hands dealt per shift by the dealer. This information may be downloaded from the CTGS manually or networked with the house computer system to do this automatically.

As defined herein, a "chipless gaming table" is a traditional live table game experience on a novel gaming platform that includes a casino game played according to predetermined set(s) of rules, at least one dealer, physical playing cards, and at least one player to place at least one electronic wager to participate in the game provided. The chipless gaming table includes a plurality of electronic player displays and touch screen wagering interfaces, the displays flush mounted into the gaming table surface, wherein players place wagers and execute game decisions electronically on displays equipped with touch screen controls (e.g., liquid crystal display (LCD) screens) and/or other touch screen forms of suitable user interface technology while playing a live table game.

In a preferred embodiment, the chipless gaming table includes a dealer PC/game server, wherein the PC/game server is located where it is easily accessed by the dealer, for example, through a dealer I/O system that may be in front of the dealer, to the side of the dealer (on or associated with the table) and/or in a chip tray.

Preferably, the PC/game server is operatively associated with an intelligent card-handling and/or card-reading device located on the table. The device preferably has card-reading capabilities. The intelligent card-handling device (i.e., a card-reading shoe or shuffler) correlates read card rank and suit information with known stored card values and transmits the correlated card data to the dealer PC/game server for use in administering the game. Although card-handling devices that read special card markings on cards can be used as a part of the disclosed systems, it is preferred that the intelligent card-reading devices read the standard rank and/or suit markings on conventional playing cards, eliminating the need for the casino to use specially marked cards.

The dealer PC/game server has a main game controller programmed with the rules of the game (and optionally other games) being executed at a table, wherein the dealer PC/game server receives and correlates the card information received from the card-handling device with known game outcomes and the dealer PC/game server determines a game outcome(s) based on the actual dealt card values. The dealer PC/game server is in communication with a plurality of electronic wagering interfaces, wherein each electronic wagering interface transmits, and receives, updated game and wagering information as each game progresses and as each game is eventually concluded.

Figure 11:
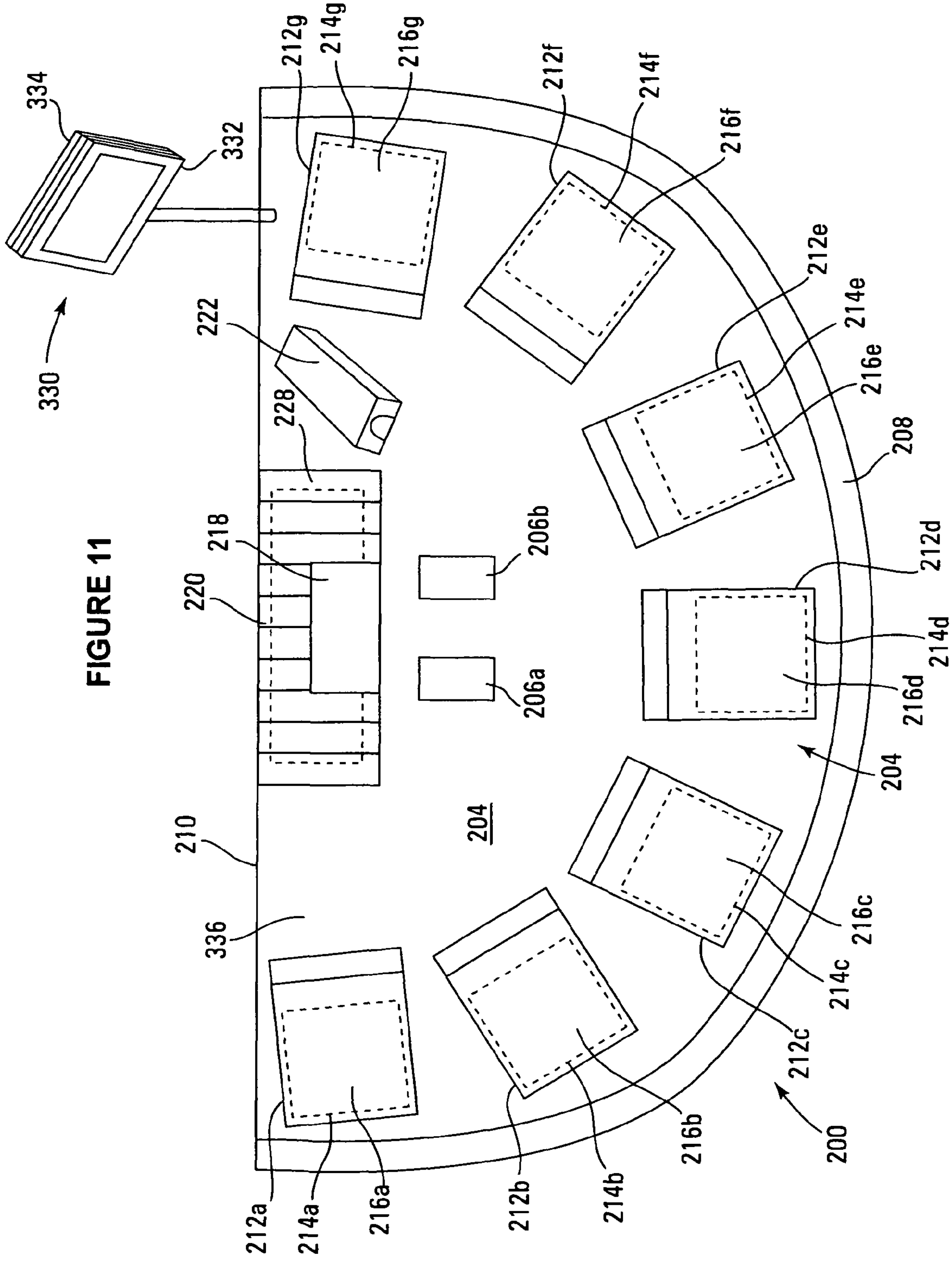
FIG. 11 shows an embodiment of a table system layout for chipless gaming tables described herein.

One preferred embodiment of a player display for the chipless gaming table features LCD touch screen technology, but plasma and/or other suitable technology may be employed as desired. Preferably, a plurality of displays with touch screen controls are flush mounted into a gaming table surface at each player position (as shown in FIG. 11, and as described in detail elsewhere). The controls in one embodiment are divided into two separate areas and the different areas serve a number of purposes, including functioning as a player wagering interface. It is preferred that each display has its own processor, wherein each processor controls its own display, and each display processor is in communication with a main game controller/game server. In a preferred form of the invention, the display processor administers graphics functions of the display. All other game events are administered by the central game controller.

Figure 2:
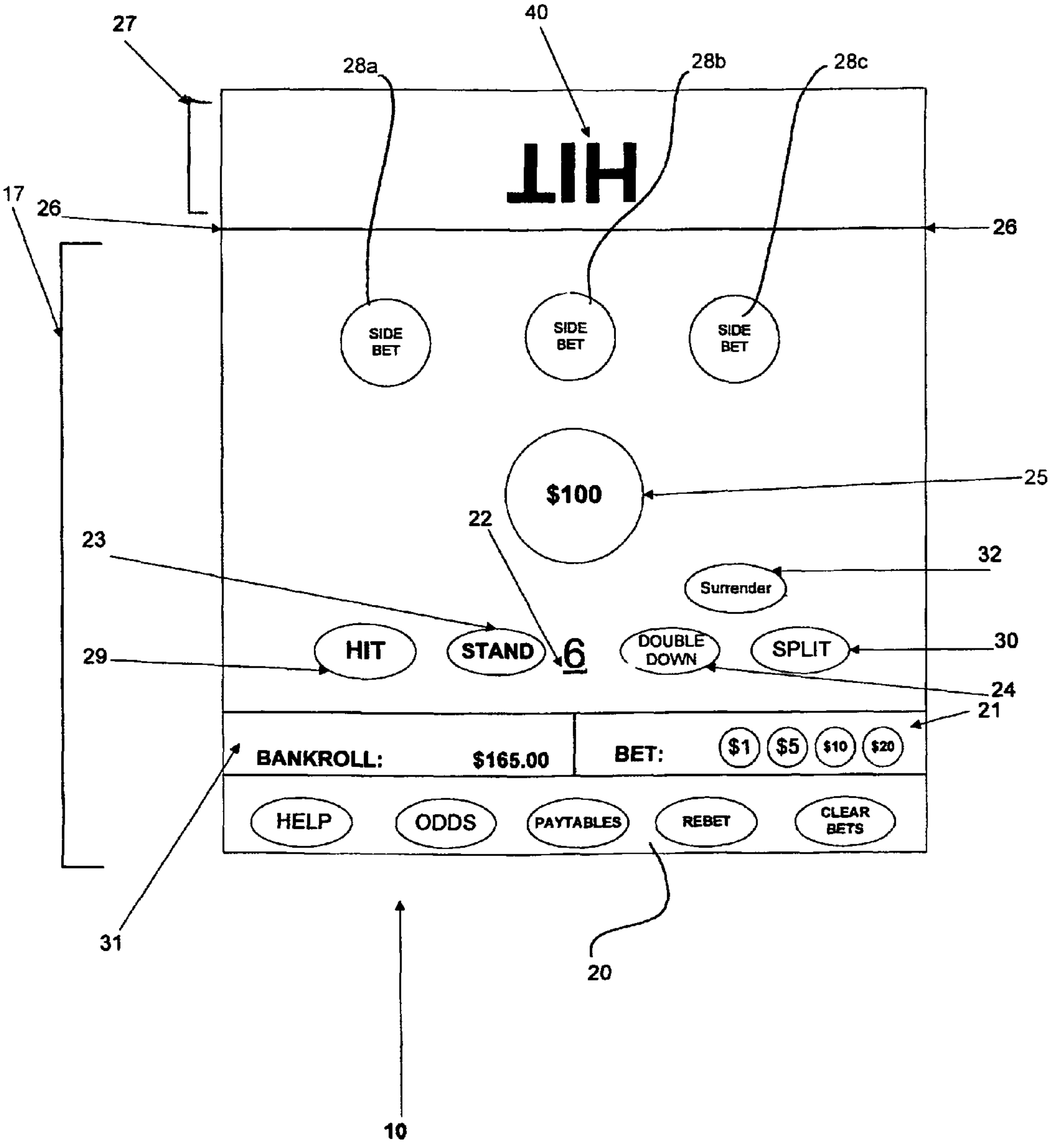
FIG. 2 shows the player display of FIG. 1 and a player play decision in the dealer area.

One preferred embodiment of the player display, as shown in FIG. 1, enables the player to input play decisions as well as wagering decisions. For example, a player area 17 of a player station 10 includes commands that are carried out by the dealer. In the game of blackjack, "stand" 23 and "hit" 29 instructions can be communicated via the touch screen controls to the game controller as well as provide a visual instruction to the dealer. When the dealer responds to a "hit" 29 command input by the player (the hit command displayed to the dealer in a dealer area 27 as shown in FIG. 2), the controller receives a card rank and/or suit signal from the card-handling device (preferably a card-reading shoe), and the controller now knows that the dealt card should be associated with the hand dealt to the player position that requested the hit card. Enabling the calling of cards or commands to "split" 30, "double-down" 24, "hit" 29, or "stand" 23 similarly enable the game controller to assemble hand information and associate that hand information with a particular player station 10. The player station 10 can be equipped with a separate or integrated player tracking system (not shown) of known configurations that enable the game processor to associate win/loss information with a particular player.

The player station 10 is advantageously divided into the player area 17 and the dealer area 27. The dealer area 27 has multiple inventive functions as will be described in more detail below. In a first mode, the dealer area 27 displays a game outcome 41 in a format that is oriented for view by the dealer. This information is used by the dealer to confirm that the player is entitled to a payout. Payouts are preferably made automatically. However, the information of the game outcome 41 is useful for the dealer to react positively to the player win, and encourage the player to rebet the winnings, maintaining the ambiance of a live table game experience. In a second mode, the dealer area 27 is used to instruct the dealer to take appropriate action.

Referring to FIG. 2, one possible dealer action is to deal the player a "hit" card, as shown by instruction 40. Other instructions 40 specific to blackjack might be to "stand," only deal "one more card" when the player doubles down, to "deal more cards" when a player has split a pair, etc. In a third mode, dealer area 27 is used to display game information or advertisements in an orientation viewable by the player. In this mode, the alphanumeric information or graphical information is oriented such that the player can readily read and/or understand the message conveyed. In a fourth mode, the dealer area 27 is touch screen enabled, providing the dealer with a means for inputting play information, such as concluding the play of a hand, activating a player display to request player commands, deactivating the player display, indicating the close of wagering, or other activities such as setting and rearranging hands.

In the game of pai gow poker, for example, it might be necessary to display player cards on the dealer area 27 or player area 17 of the display, although it is not necessary to display virtual cards in administering the game of blackjack. In the game of pai gow poker, the player's seven cards might be displayed in the dealer area 27, and the dealer might be instructed to "set hands." The dealer would either touch the five cards that define the high hand or the two cards that define the low hand. In one embodiment, the dealer can touch and drag cards to group them in the desired manner. In other embodiments, touching the cards defining one hand rearranges the cards on the display into set hands. The player must then arrange the physical cards to match the dealer instructions.

The touch screen is further enabled to allow the dealer to touch and drag cards from hand to hand, in the event that the dealer determines that the dealer's setting of the hand does not comply with the "house way." When the dealer area 27 is being used to instruct the dealer, the text is preferably inverted such that the information can be understood by the dealer. When the dealer area 27 is used to provide information to the player, the information is preferably oriented so that the player can readily understand the information. In one exemplary form of the invention, a separation line 26 is provided to divide the player area 17 and the dealer area 27.

An essential feature of the chipless gaming table is a player station 10 with at least one touch screen control panel overlay, or control panel. The overlay preferably extends over the entire surface of the display. The display may be pressure sensitive, heat sensitive, moisture sensitive, conductive or use any other known technologies to input decisions. In other examples of the invention, the touch screen controls cover only a portion of the display. The touch screen controls are configured to provide a player control area 20 for the player to make game decisions and to obtain information on how to play the game.

An exemplary player control area 20 includes a plurality of electronic buttons, for example, help, odds, pay tables, rebet and clear bet buttons. The "help" button activates the display of a separate help screen that provides game rules and could offer strategic advice to the player on wagering and other game play decisions. The "odds" button displays the true odds payout for making a side bet on a particular combination of player and dealer initial cards. The true odds betting methods are disclosed in co-pending U.S. patent application Ser. No. 12/075,008, filed Mar. 7, 2008, entitled "Side Bet Odds Wagering System" and assigned to Shuffle Master, Inc. The content of this disclosure is herein incorporated by reference. The "pay tables" button activates a screen that displays the pay table or tables showing winning combinations and corresponding payout odds for the base game and/or a side-bet wager or wagers. The "rebet" button allows a player to make the same size wager as made in the previous hand. The "clear bets" button resets the display so that the player can make a new wager.

The control panel includes a bankroll area 31 showing the total number of credits the player has available for play, and a virtual chip area 21 that displays the various denominations of virtual chips that can be wagered in the game.

Various decision options relative to the game rules of blackjack are located above the bankroll area 31 and the virtual chip area 21, such as, but not limited to, a stand button 23, a hit button 29, double-down button 24, a split button 30, and a surrender button 32, wherein players execute each desired game decision by using hand motions such as, but not limited to, touching and/or tapping the desired button. The player area 17 of the display in one embodiment is programmed to display the running count of the player's hand in area 22. In other embodiments, this information is not displayed.

Above the player instruction buttons (i.e., hit, stand, double-down, split, surrender, insurance (not shown)), an initial wager area 25 is provided to indicate the amount of the wager. The player makes this wager by touching the $20 chip (five times) in the virtual chip area 21. The player can optionally make a number of side bets in one or more side-bet areas **28*a*, 28*b* and 28*c*. In one exemplary form of the invention, the player can change his or her bet before the close of betting by depressing the "clear bets" button on player control area 20. At the conclusion of play, payouts may be displayed by showing virtual chips "paid out" next to the betting areas 25, 28*a*, 28*b*, and 28*c*, and the bankroll area 31** is incremented with the appropriate credits. An alphanumeric "win" indication (not shown) may also pop up on the player display.

As noted, a preferred method of practice of the present technology is for the dealer information display segment of dealer area 27 or the player area 17 of the video display screen of player station 10 or both segments to be provided by picture-in-picture technology, whether in analog or digital format. Circuitry and processing support systems enabling this picture-in-picture format and picture-on-picture format are known in the video monitor and electronic imaging art, such as in U.S. Pat. No. 7,573,938, issued Aug. 11, 2009 to Boyce et al.; and in U.S. Patent Application Publication Nos. 2007/0275762 (Aaltone et al.); 2007/0256111 (Medford et al.); and 2004/0003395 (Srinivas et al.).

The dealer area 27 may display a dealer instruction 40 such as a "hit". The player decision to hit in blackjack is input by pressing the "hit" button 29. The decision was executed after evaluating a dealt two-card blackjack hand (not shown) totaling 6 (six), the total displayed in area 22. Displaying the card count is possible when a chipless table is used in connection with a card-reading shoe or other card-reading device such as an overhead camera imaging system as disclosed in U.S. Pat. No. 7,901,285, issued Mar. 8, 2011, the content of which is incorporated herein by reference. The card information is sent to the game processor. The game processor calculates the hand count and transmits the count to the player display. The game processor further instructs the display to display the count in area 22.

The card hand total displayed in area 22 may optionally be presented on a separate upright player-directed display 332 facing the players (and optionally on the screen segment facing the pit, pit-directed display 334), illustrated in FIG. 11. It is important to note that a player decision/action is displayed in the dealer area 27 and presented in the form of an instruction 40 readable by the dealer (inverted, rather than in an orientation readable by the player). Since the dealer is standing and facing the players, the text of instruction 40 is inverted (upside down) with respect to the player's view and is easily read and/or interpreted by the dealer. The inverted text showing in the dealer area 27 provides the dealer with player game information as well as informs the dealer that a player decision "hit" has been acknowledged by the system. The dealer must then respond by taking action. The dealer area 27 clearly informs the dealer a player is requesting an additional card/"hit" in a text and manner readable by the dealer. The dealer, in response, then removes the next card from the shoe and delivers the card to the player that requested the "hit."

As a game progresses to a conclusion, a player's final game outcome 41 (FIG. 1) shows in the dealer area 27, wherein the dealer can take appropriate action. Other information that can be shown in the dealer area 27 includes blackjack, bust, jackpot win, etc.

Figure 3:
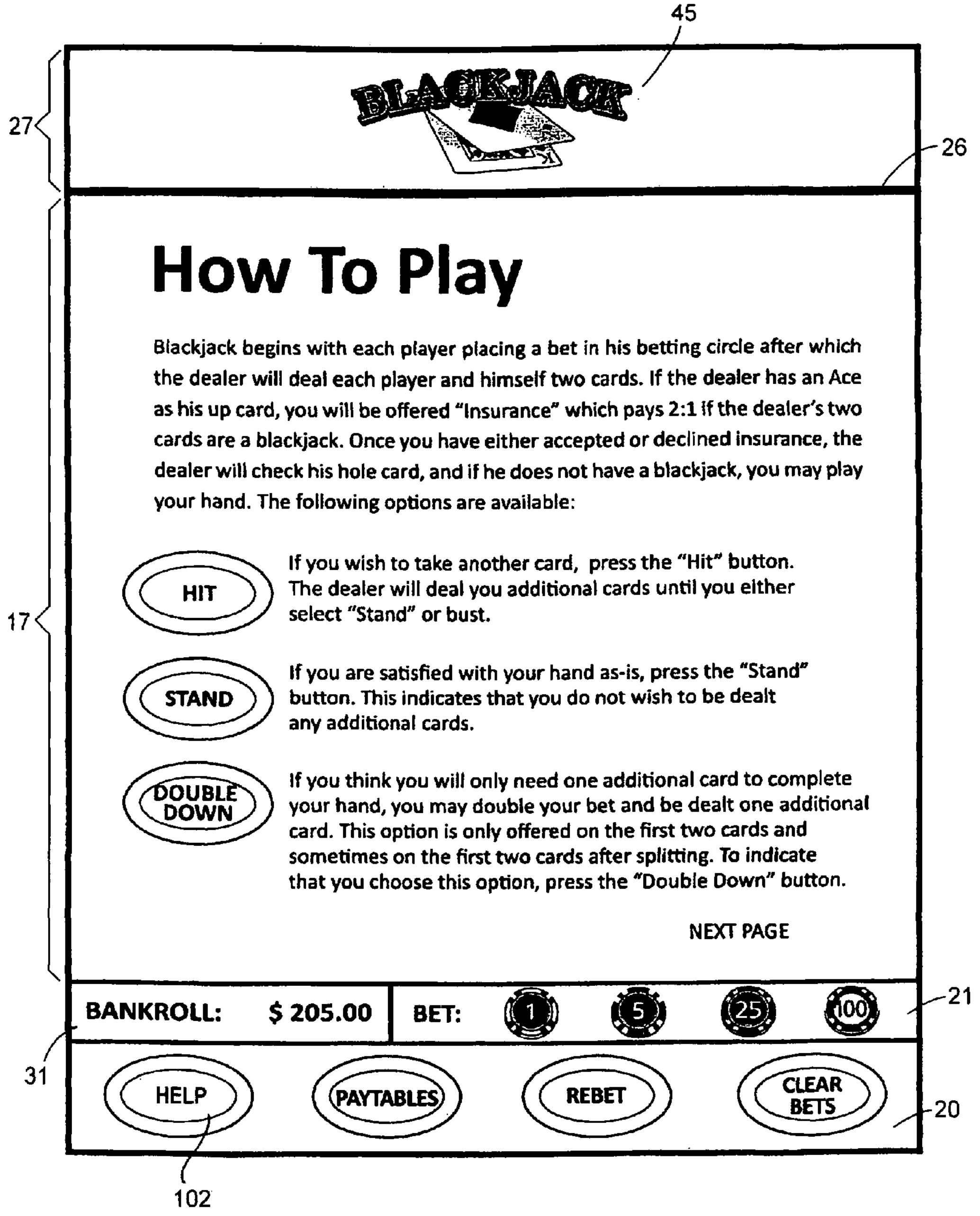
FIG. 3 shows the player display of FIG. 1 displaying available blackjack side bets in a player screen area, and an indication of game identity in the dealer area.

FIG. 3 shows an embodiment of a "how to play" player game information screen design, wherein a player views game information in the player area 17 by pressing a "help" button 102 in the player control area 20. In this mode, it should be noted that the separation line 26 remains displayed, and the dealer area 27 is displaying a game title/logo 45 in a text and manner readable by the player.

Figure 3A:
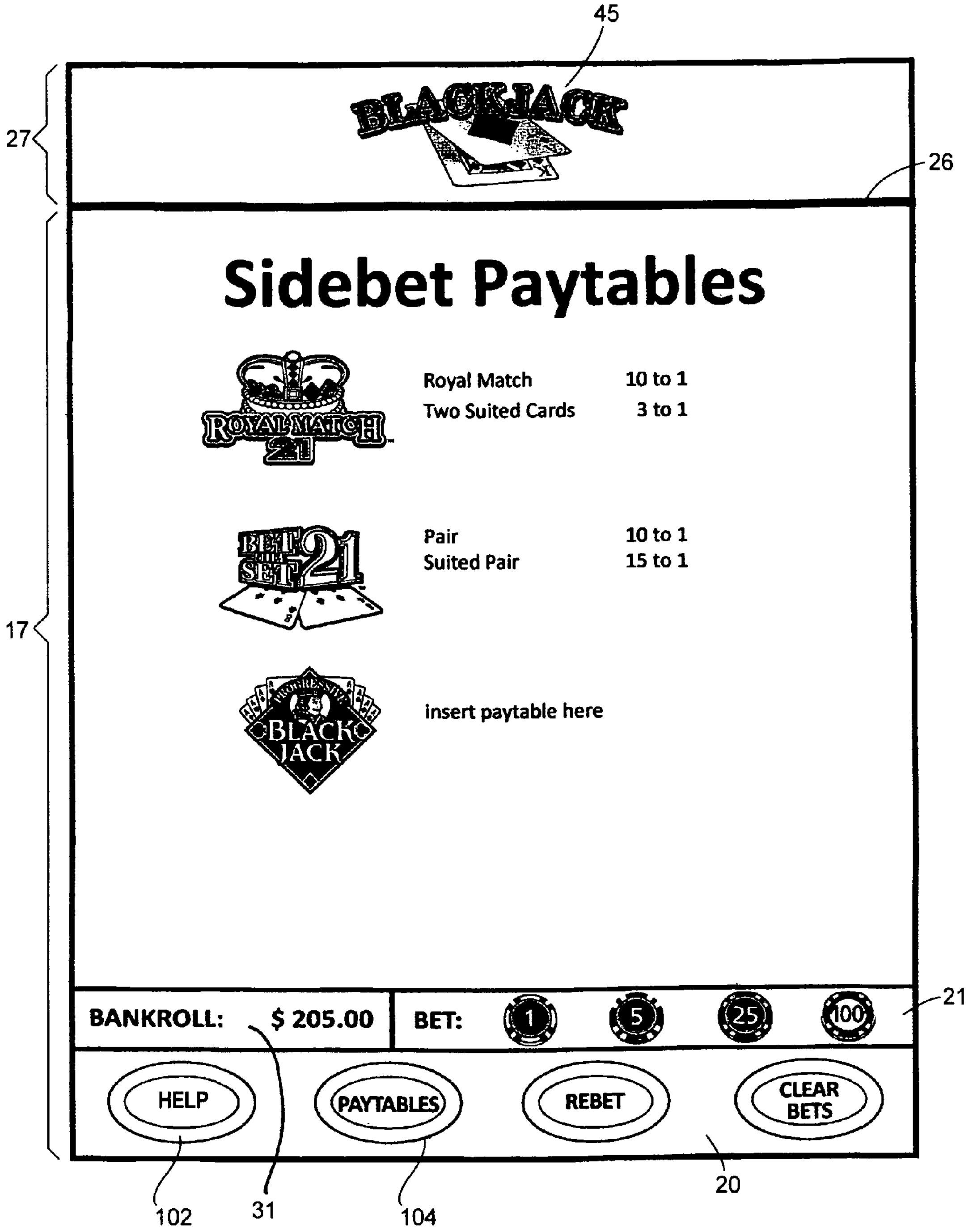
FIG. 3*a* shows the player display of FIG. 1 displaying pay tables for available blackjack side bets in the player display area.
Figure 4:
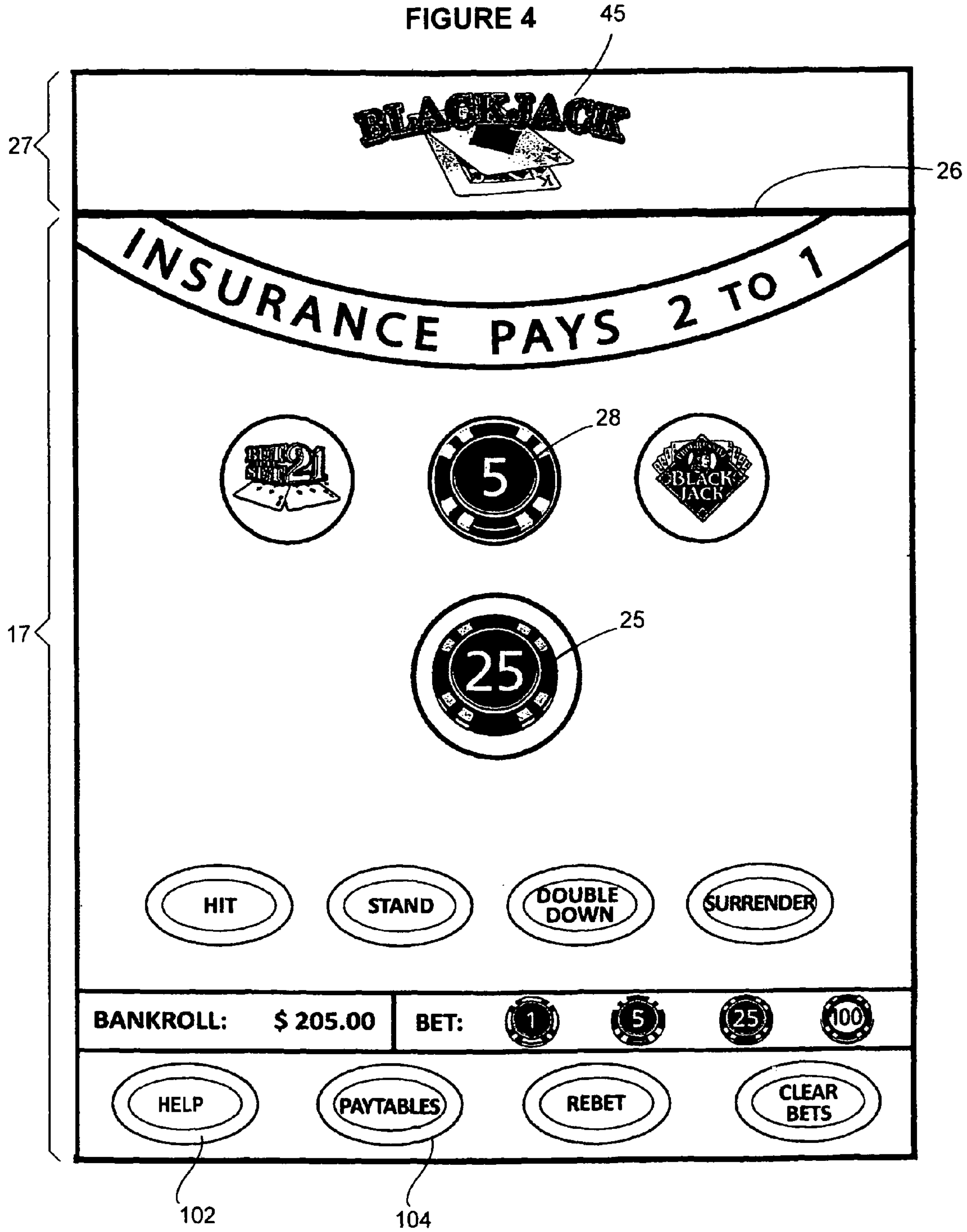
FIG. 4 shows the player display of FIG. 1 in a blackjack game after a player has placed a game wager and a side bet wager and before the player has executed a game decision.

FIG. 3A shows a preferred embodiment of "side-bet pay tables" screen format wherein the game title/logo 45 is displayed in a text and/or manner readable by a player. It is preferable that the dealer area 27 of the display be capable of displaying information readable by the player as well as readable by the dealer in different stages of use. The side-bet pay table information is accessed by a player when a pay table button 104 is touched in the player control area 20 located below bankroll area 31 and virtual chip area 21 indicators. FIG. 4 shows an embodiment of a split screen after a player has placed an initial wager at initial wager area 25, and a side-bet wager 28 and before the cards are dealt. Again it should be noted that the dealer area 27 displays the game title/logo 45 in a manner readable by the player at this stage of play.

Figure 5:
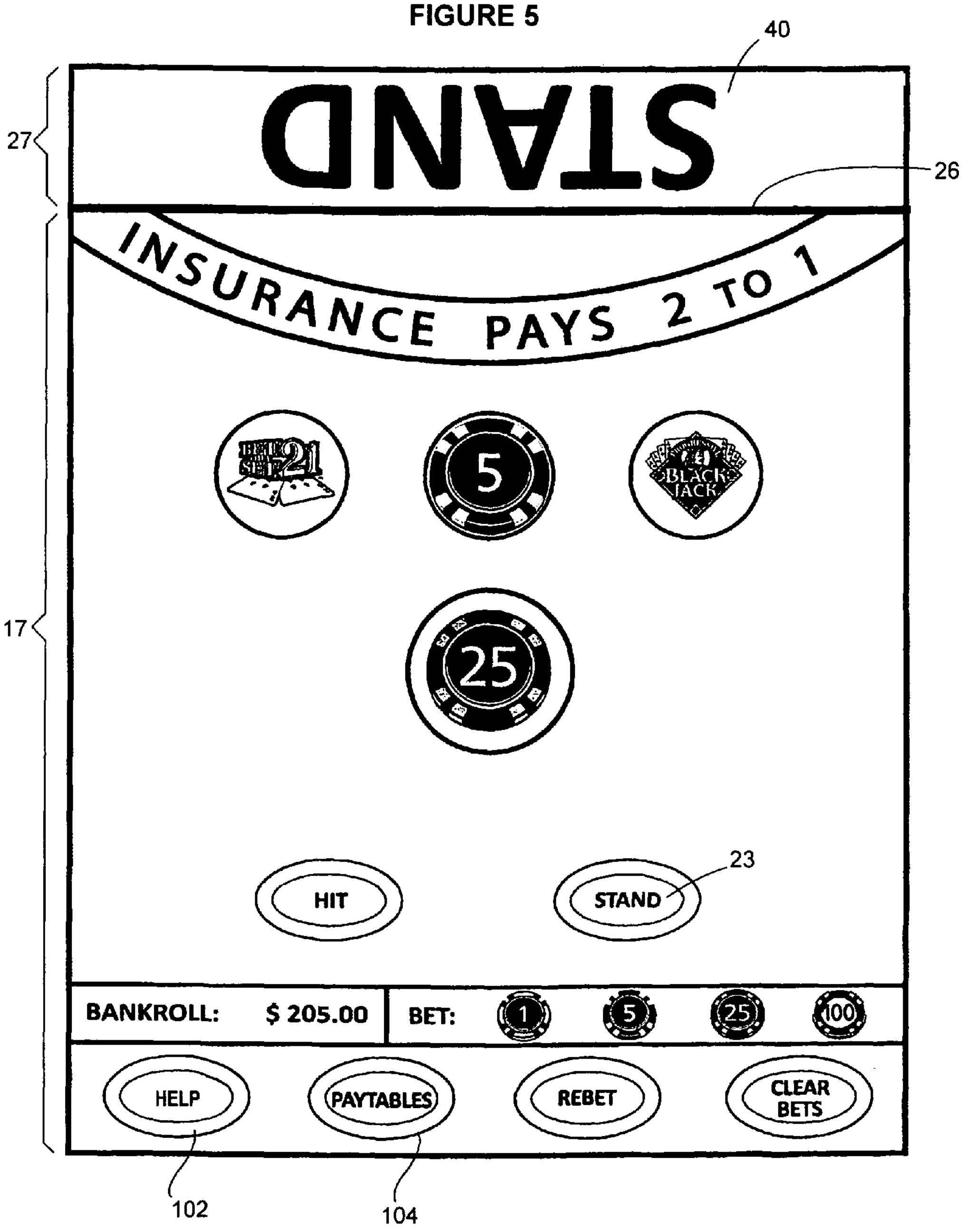
FIG. 5 shows the player display of FIG. 1, wherein an executed player decision to "stand" is displayed in the dealer display area.

FIG. 5 shows an embodiment of a player display, wherein a player has input a "stand" decision by depressing stand button 23 based on dealt card information. It should be noted the separation line 26 continues to separate the player area 17 from the dealer area 27. The dealer area 27 is showing the player decision to stand as instruction 40 in substantially inverted text (upside down for the player) and in a manner easily read by the dealer.

Figure 6:
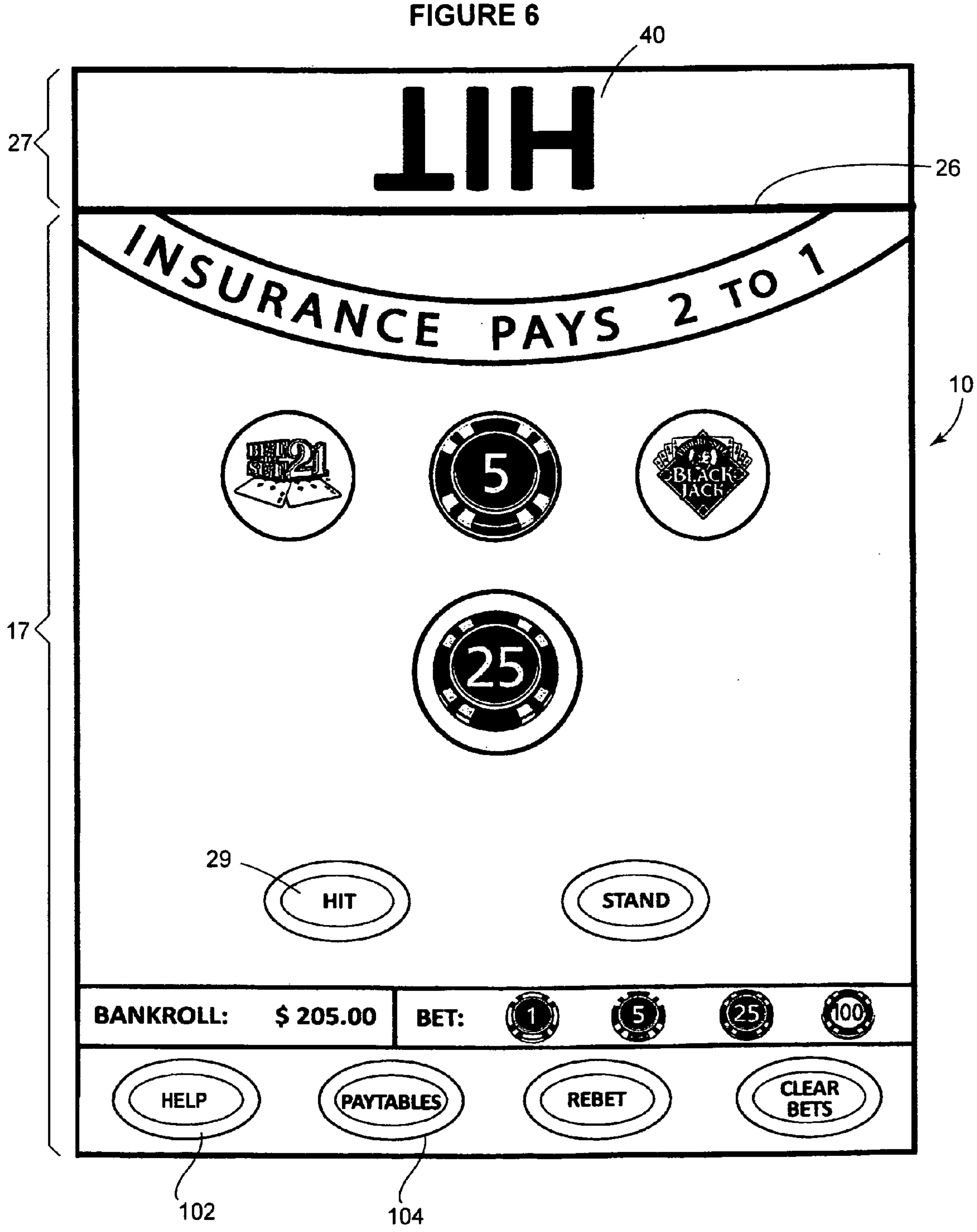
FIG. 6 shows the player display of FIG. 1, wherein an executed player decision to "hit" is displayed in the dealer display area.

FIG. 6 shows another embodiment of the display, wherein a player has input a hit decision by depressing hit button 29 based on dealt card information. The screen display shows the dealer area 27 is displaying the player "hit" decision as instruction 40 in text substantially inverted in a manner easily read by the dealer. The displayed information not only indicates the player decision to the processor, but it provides an instruction 40 for the dealer to take appropriate action. In the case of seeing the "hit" command, the dealer dispenses the next card to the player.

Figure 7:
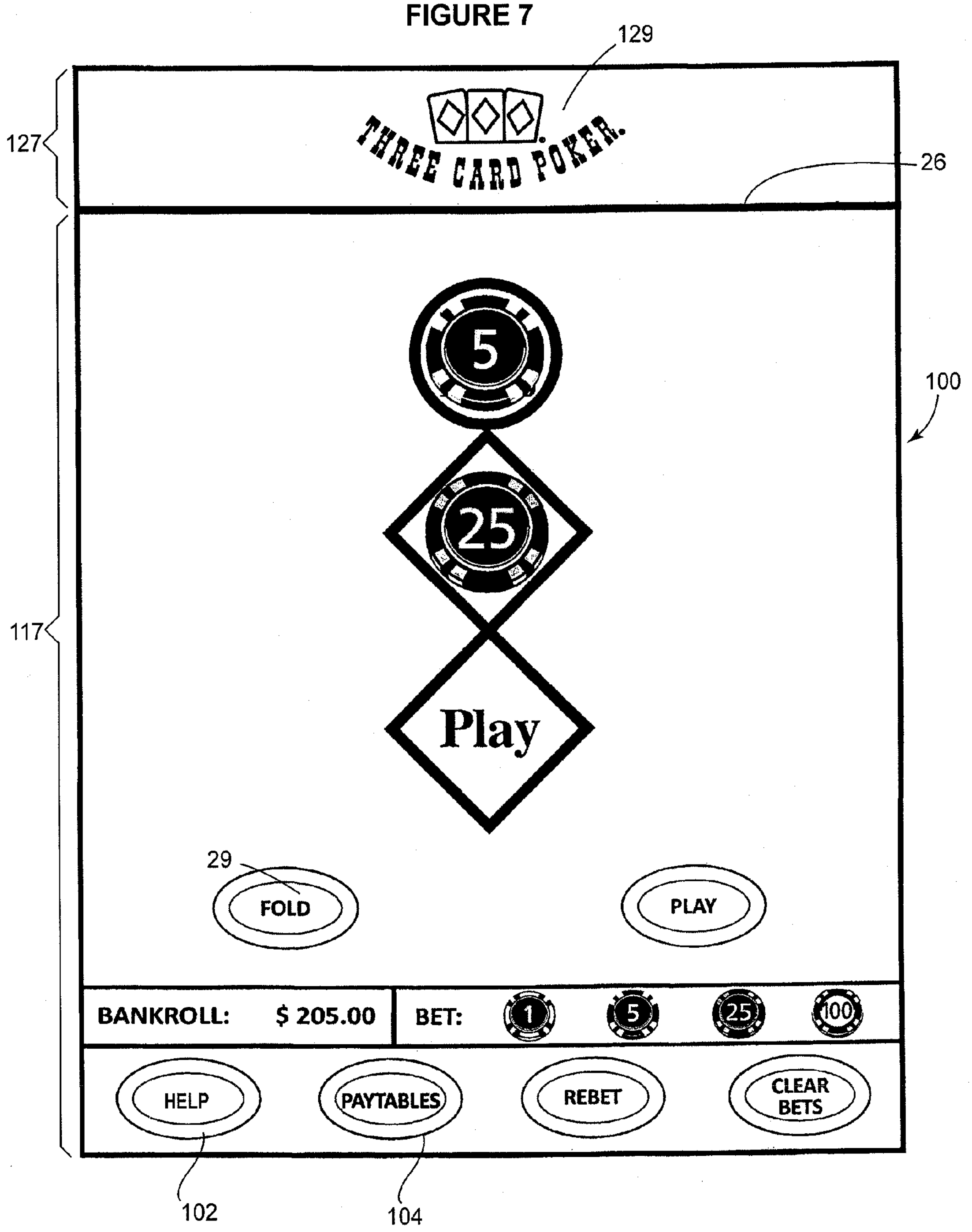
FIG. 7 shows a THREE CARD POKER® player display, wherein a player's initial wagers prior to the execution of a player game decision are displayed in a player screen area, and game name and logo are displayed in a dealer area.
Figure 8:
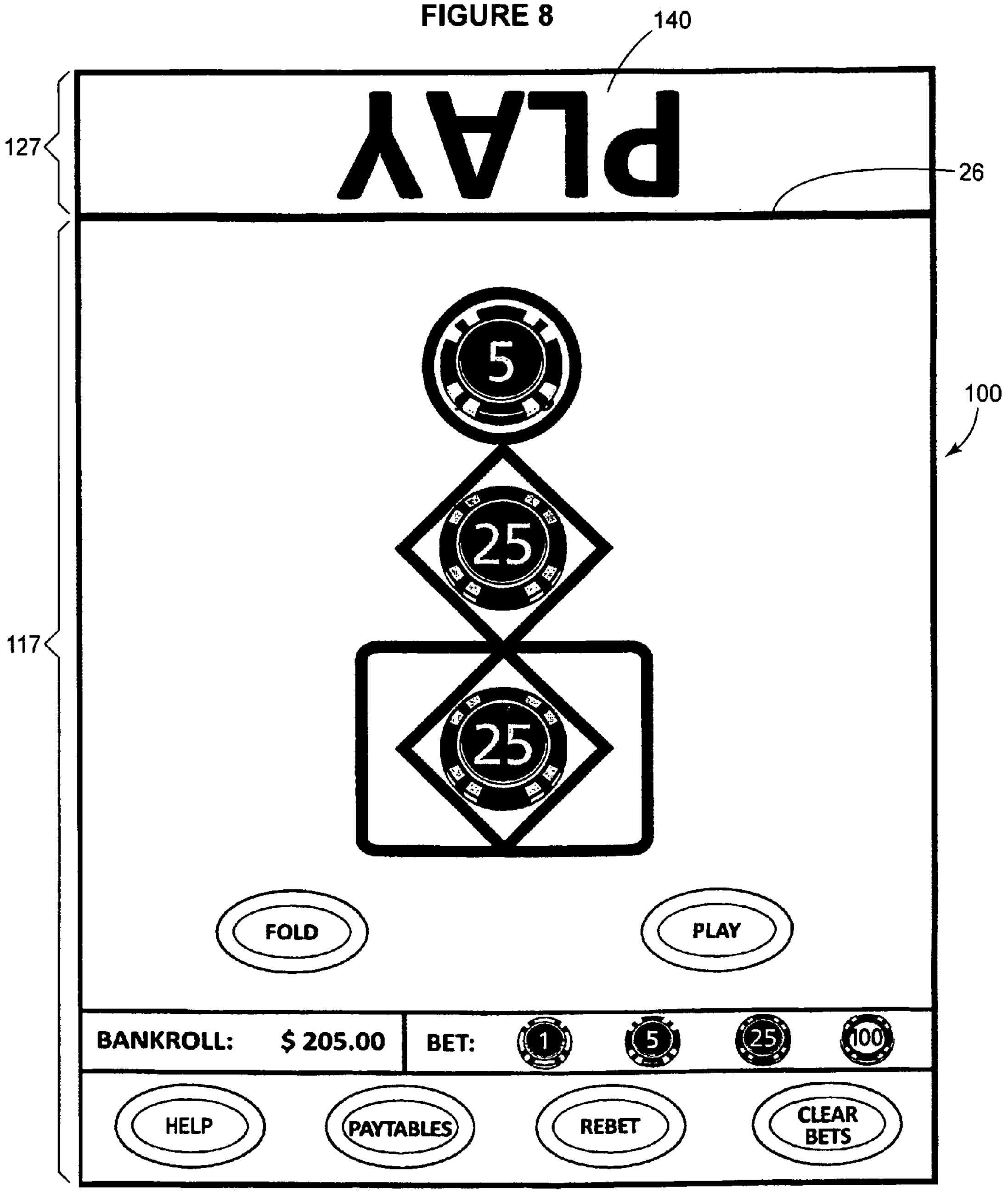
FIG. 8 shows the THREE CARD POKER® player display of FIG. 7 after a player has executed a play decision, wherein the play decision is showing in the dealer area.
Figure 9:
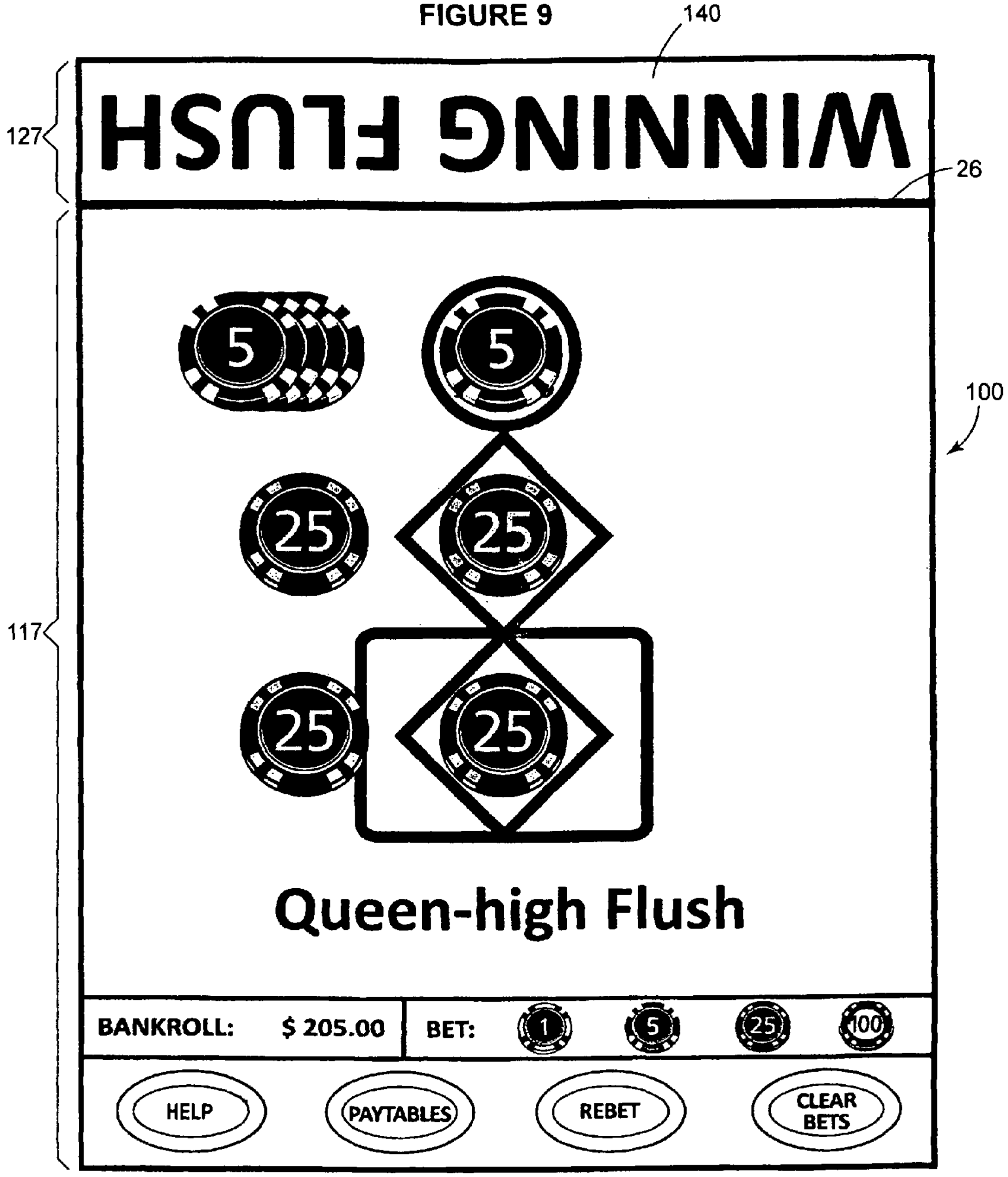
FIG. 9 shows the THREE CARD POKER® player display of FIG. 7 showing a player's game outcome, wherein the player's game outcome is also showing in the dealer area.
Figure 10:
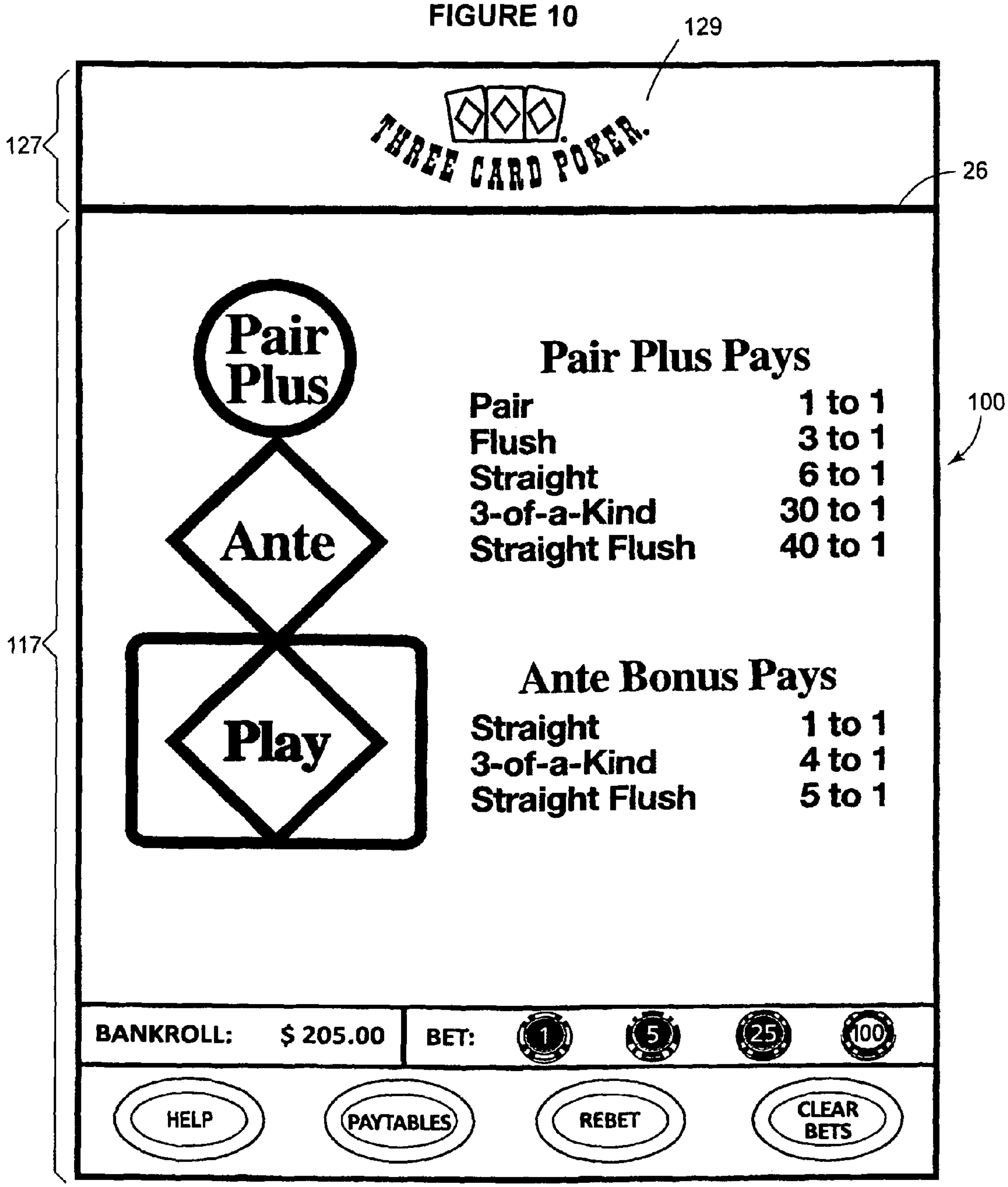
FIG. 10 shows the THREE CARD POKER® player display of FIG. 7 showing the THREE CARD POKER® "pair plus" and "ante bonus" pay tables, wherein the pay tables are showing in the player screen area, and the game name and logo are displayed in the dealer area.

FIGS. 7, 8, 9, and 10 show exemplary split screen displays for a THREE CARD POKER® game, wherein the game display, game options and betting areas differ according to the rules of THREE CARD POKER® game. A player display 100 includes a player area 117 as well as a dealer area 127. As shown in FIGS. 7 and 10, the dealer area 127 is displaying a game logo 129, arranged to be viewed by the player. As in the previous embodiments, as shown in FIGS. 8 and 9, instruction text 140 is displayed in the dealer area 127 to provide the dealer with instructions to facilitate play and is displayed in a manner easily interpreted by the dealer. Prior to a player game decision and/or the start of a game, the dealer area 127 displays the game logo 129 and/or game name in a manner readable by the player.

The system comprises a gaming table having at least:

a. a player station having a data entry (e.g., touch screen) capability and preferably an independent graphics processor;

b. a central CPU controlled by the dealer or house;

c. a communication link between each player station and the central CPU;

d. a card delivery system (e.g., a delivery shoe with card reader, a card shuffler with card reader, or a manual shoe with overhead camera imaging) that provides rank/count/suit-type information on cards delivered; and e. a dealer input, preferably in the form of a dealer display with touch screen controls.

Although it is not necessary to provide touch screen controls at the player or dealer stations, this type of user input is desirable because it can be reconfigured through reprogramming and no hardware components must be changed out to reprogram the system to administer different games.

After all bets are placed, the dealer may touch a "deal" field on a screen of the dealer area 127. This prevents all entered bets from being changed, and locks out all new bets. The dealer may then begin to deal (by either removing the first card from the dealing shoe or pressing a switch on a shuffler for dispensing a hand of cards). In one embodiment, once the first card is dealt, a plurality of new fields appears on each player's touch screen.

Different communication and control relationships can exist between player input systems, game controllers, casino computers, databases, and data storage media within a single casino or multiple casinos. The relationships are known within the communication-information technologies field as master-slave systems, thin client systems, client server systems and blended systems. The blended system is understood to be a system that is not fully master-slave, where a single dominant computer gives orders/commands to a subordinate slave computer or processor, or purely an input system (e.g., buttons only, cash input, and information signals only, without substantive commands being sent, and the like), nor is it a completely or substantially coequal system (peer-to-peer), where data processing and commands may be performed by multiple systems (multiple computers) with defined regions of control and authority. These differing relationships are contemplated by the present invention. In one exemplary form, the graphics functions are managed by the player processor, and all other functions are managed by the game CPU.

Underlying Architecture for Chipless Gaming Tables

FIG. 11 shows an exemplary card game system 200 for playing live card games with physical playing cards (e.g., cards 206*a* and 206*b*) according to technologies enabled and disclosed herein. Card game system 200 can be of a variety of common constructions or configurations as are typically used as the structural components of gaming tables in the industry. The typical gaming table has a tabletop or playing surface 204 and a perimeter pad or armrest 208, which extends at least about a portion of a table periphery 210 facing players. The relatively straight, back portion of the table periphery 210 is used by the dealer (not shown) and can be partly or wholly padded as may vary with the particular table chosen. Seven player display/input systems 212*a*-212*g* are shown. Each of the player display/input systems 212*a*-212*g* has a processor 214*a*-214*g* (shown in phantom) and a touch screen entry surface 216*a*-216*g*. There may be an optional dealer chip tray 220. There is also a game controller, CPU or casino computer 228 (shown in phantom) whose location at the card game system 200 is relatively unimportant, but which must be in direct (hardwired, wireless or networked) communication with each individual player processor 214*a*-214*g* and a card shoe 222 (i.e., card-reading and/or delivery system) from which playing cards are supplied, with at least the rank/count (and preferably also suit) of individual cards known as the cards are removed (for example, one at a time), and delivered to player positions and/or the dealer position. The card shoe 222 is in communication with game controller 228 by wired or wireless communication methods. The individual processors 214*a*-214*g* could also be in communication link with the game controller 228 by wireless or hardwired connections. Communication is not limited to electronic or electrical signals, but may include optical signals, audio signals, magnetic transmission or the like.

The playing surface 204 is provided on the table where participants of the card game(s) play. One or a plurality of players (not shown) sit or stand along the semicircular portion and play a desired card game, such as the popular casino card games of blackjack, baccarat, poker and poker variants. Other card games are alternatively possible, although the system described will be discussed with respect to the play of blackjack.

The card game system 200 also advantageously includes the betting chip tray 220 that allows the dealer to conveniently store betting chips used by the dealer in cashing players in and out of the game. A money drop slot (not shown) is further included to allow the dealer to easily deposit paper money bills thereinto when players purchase credits.

Card game system 200 can support a system, or form a part of a system, for playing live card games, which is constructed according to the present invention. The card game system 200, described herein, in one example of the invention is a retrofit system which has been added to a standard gaming table support frame. Such a retrofit system includes an upright communal table display 330 which displays images which depict game information such as pay tables, hand counts, win/loss information, historical win/loss information by player, and a wide variety of other information considered useful to the players. The display 330 is a two-sided display that will be explained more fully below.

The system also preferably includes a dealer control 218 which is preferably provided in the form of a display with touch screen controls positioned within the chip tray 220. In an alternate embodiment, the dealer control resides on the card shoe 222 or as a separate keypad (not shown). The individual player position processors are preferably graphics processors 214*a*-214*g* and not full content CPUs as a cost saving, space saving, and efficiency benefit. With the reduced capacity in the processor as compared to a CPU, there is actually reduced likelihood of tampering and fraudulent input.

The individual components provided for functionality at each position (e.g., the slave, servant, coequal, or master functionality) are not limited to specific manufacturers of formats, but may be used according to general performance requirements. It is not even necessary that identical computing formats (MAC®, PC, LINUX®, etc.) be used throughout the system, as long as there is an appropriate I/O communication link and language/format conversion between components. Further discussion of the nature of the various components, including definitions therefore, will be helpful.

Flash memory (sometimes called "Flash RAM") is a type of constantly powered nonvolatile memory that can be erased and reprogrammed in units of memory called blocks. It is a variation of electrically erasable programmable read-only memory (EEPROM) that, unlike Flash memory, is erased and rewritten at the byte level, which is slower than Flash memory updating. Flash memory is often used to hold control code such as the basic input/output system (BIOS) in a personal computer. When BIOS needs to be changed (rewritten), the Flash memory can be written to in block (rather than byte) sizes, making it easy to update. On the other hand, Flash memory is not useful as random access memory (RAM) because RAM needs to be addressable at the byte (not the block) level. Flash memory gets its name because each microchip is organized so that a section of memory cells are erased in a single action, or "Flash". The erasure is caused by Fowler-Nordheim tunneling in which electrons pierce through a thin dielectric material to remove an electronic charge from a floating gate associated with each memory cell. The Intel Corporation (Santa Clara, CA) offers a form of Flash memory that holds two bits (rather than one) in each memory cell, thus doubling the capacity of memory without a corresponding increase in price. Flash memory is a non-volatile computer memory that can be electrically erased and reprogrammed. It is a technology that is primarily used in memory cards, and USB Flash drives (thumb drives, handy drives, memory sticks, Flash sticks, jump drives, currency sensors, optical sensors, credit entries, and other signal generators) for general storage and transfer of data between computers and other digital products. It is often considered a specific type of EEPROM (Electrically Erasable Programmable Read-Only Memory) that is erased and programmed in large blocks; in early Flash the entire chip had to be erased at once. Flash memory has also gained popularity in the game console market, where it is often used instead of EEPROMs or battery-powered SRAM for game save data.

The phrase "non-volatile" means that it does not need power to maintain the information stored in the chip. In addition, Flash memory offers fast read access times (although not as fast as volatile DRAM memory used for main memory in PCs) and better kinetic shock resistance than hard disks. These characteristics explain the popularity of Flash memory in portable devices. Another feature of Flash memory is that when packaged in a "memory card," it is enormously durable, being able to withstand intense pressure, extremes of temperature, and immersion in water. Although technically a type of EEPROM, the term "EEPROM" is generally used to refer specifically to non-Flash EEPROM, which is erasable in small blocks, typically bytes. Because erase cycles are slow, the large block sizes used in Flash memory erasing give it a significant speed advantage over old-style EEPROM when writing large amounts of data. Non-volatile memory, (NVM), or non-volatile storage, is computer memory that can retain the stored information even when not powered. Examples of non-volatile memory include read-only memory (ROM), Flash memory, most types of magnetic computer storage devices (e.g., hard disks, floppy disk drives, and magnetic tape), and optical disc drives. Non-volatile memory is typically used for the task of secondary storage, or long-term persistent storage. The most widely used form of primary storage today is a volatile form of random access memory (RAM), meaning that when the computer is shut down, anything contained in RAM is lost. Flash memory may also be provided in chips, field-programmable gate arrays (FPGAs), ASICs and Magnetic RAM (MRAM). The latter would allow for computers that could be turned on and off almost instantly, bypassing the slow start-up and shutdown sequence.

The "chipless table" format and architecture described herein comprises generic concepts and specific disclosures of components and subcomponents useful in the practice of the present technology. It should be appreciated at all times that equivalents, alternatives and additional components, functions and processes may be used within the system without deviating from the enabled and claimed technology of this invention.

One preferred construction of a chipless table has from three to eight players (shown in FIG. 11 as seven player positions) with five, six or seven player display/input systems 212*a*-212*g* (with independent processors 214*a*-214*g*) being preferred, a dealer control 218, a double-sided table display 330 (shown in FIG. 11 with a player-directed display 332 and a pit-directed display 334), a card shoe 222 (or card-reading shuffler or overhead camera imaging system or table-mounted card reader (not shown)), a chip tray 220, playing cards 206*a*, 206*b*, a generic felt layout 336 and a game controller 228 using the AQUARIUS CONTROLLER™ protocol (under-the-table game controller, manufactured by Progressive Games, Inc. of Las Vegas, Nev.), for example.

The game information (which is preferably for multiple games) is configurable and will be set up during the initial installation of the table and may be switched from game to game on-the-fly at each table. It is from this set up that the game information is selected so that the graphics on the player touch screen entry surface 216*a*-216*g*, dealer control 218, pit-directed display 334 and player-directed display 332 provide the correct information regarding the game in play. It is the capability of changing individual types of game events (e.g., from blackjack to baccarat) at a table that enables, or even requires, that the generic felt layout 336 is free of any permanent printing that identifies only a specific game at a table. There may be separate monitors (not shown) that enable display of game names, game rules and pay tables for individual games, or under table back-lighting that may project such information display on the table. It is important to note that the dealer area 127 (shown in FIG. 7) of each player screen is capable of displaying the game name and logo when the dealer area 127 is not being used to provide game information. By displaying the game name and logo information in dealer area 127, it is not necessary to print the same information on the generic felt layout 336.

Using the pit-directed display 334, the game is selected by casino personnel and communicated to the game controller 228 via a touch screen control on the pit-directed display 334. The game controller 228 (and/or a central pit controller) sends out the appropriate graphics to each of the player screens and table signs to begin game play.

One example for the basic procedure for game play is:

1. A player buys in with either cash, chips, tickets, electronic access to an account, credit card, marker, or the like.
2. The dealer adds credits to a player position using the dealer console.
3. Wagers are made electronically using the touch screen controls at each individual player position. Touch screens may be of any convenient size considering ease of view ability by players, space limitations on the table and ergonomics, and for example may be between about 4 inches and 15 inches at each player position (diagonal measurement).
4. All initial wagering (e.g., antes, initial bonus wagers, initial jackpot wagers, initial mandatory wagers) is stopped when the first card or hand is delivered. Delivery may be from the shoe or shuffler. This stopping may be effected by a signal from the shoe or shuffler (to the game processor/table computer) that actual play of a round of the underlying game has been made. Subsequent wagers (such as splitting events, double-downs, secondary wagers, play wagers, etc.) may be subsequently made in a controlled manner by the system. Player decisions are input by players using the player input areas and instructions are provided in alphanumeric or graphical form to the dealer on the dealer area of the player station.
5. The underlying game is played as normal, with physical cards being provided and all wagers and resolutions of wagers being made on the electronic wagering system. (Note: The touch screen procedures and graphics for each game usually will be different, and table play for each game will be provided, controlled, enabled and directed by the game processor/table computer.)
6. Upon hand or game completion, wager reconciliation is initiated either by the dealer (e.g., specifically inputting a signal or command by button or dealer area of the player display using touch screen or other input) or automatically by the system (which has determined by card reading events that a round or game has ended) and is reflected as an increase, no change (push) or decrease in the bankroll on the player's screen.
7. When a player leaves the table, credits are removed from the player position through the dealer console and the credits are paid out with chips, tickets, cash or credits, which are transferred to a player account from the dealer console.

In one embodiment, the table has reporting functionality, such as reports that are specific to the table and recorded by pit personnel on a regular basis. This data can be accessed on the pit display touch screen on a (for example, 15-inch) pit-directed display. The raw data from the table can be packaged and sent to a central pit or house computer for analysis (player ratings, dealer efficiency, table handling, etc.).

Dealer Control 218

Examples of properties that would be available in a dealer control 218 include:

- Buy-in and cash-out of players on the table;
- Notifies the dealer if a player chooses to cash out;
- Enables and disables player touch screens;
- Move credits if a player chooses to change seats;
- Allows dealer log-in/log-out on the table;
- Informs the dealer (initially only is desirable, although the alert may be triggered and waited for until after player's further wagering) if the dealer has a blackjack (i.e., "no peek" function); and
- Reconciles the wagers when the hand is complete when the dealer presses the "reconcile" button on the touch screen.

The CPU/Game Controller/Table Computer 228

Preferred functions of the game controller 228 are as follows:

- Stores game information;
- Manages the player terminals;
- Controls the one-way or two-way (e.g., 10-inch to 20-inch) table sign with pay tables, game information, progressive amount, etc.;
- Controls the pit sign with game setup options, table statistics, etc.;
- Controls the player buy-in process through communication with the player input system;
- Controls player cash-out process through communication with the player input system;
- Records wagers made at start of a game;
- Prevents betting after the first card is dealt (except as additional wagers are allowed during play of various games, but then only limited wagers and specific wagers);
- Receives card and/or hand information from the shoe, shuffler, overhead camera imaging system or table-mounted card reader;
- Evaluates player bets;
- Automatically pays the wins and collects losing bets;
- Enables specifically identified betting after the hand for the player terminal has been resolved;
- Interfaces to the optional jackpot system; and
- Provides touch screen resolution of events and games.

Player Display/Input Systems 212*a*-212*g*

The player touch screen (or PTS) is, for example, a 10.5-inch touch screen with an attached processor board. The player uses the PTS to make wagers and to communicate game actions to the dealer and to record game play events. The top section of the touch screen (relative to the player) is split and graphics are reversed at certain stages of use for the dealer to know what action the player is taking, and to receive instructions to take action requested by the player. Certain considerations should be made in the design to include the following:

Placement of the displays in the table should be flush with the surface (or very close) and the touch screen bezel should be minimal. This will minimize card edges snagging and getting stuck when dealt and pulled towards the player. It is actually better to have the screen slightly elevated above the plane of the table top (e.g., the felt cover or other surface), as it is easier to slide cards along a raised edge than to lift the cards out of a depression.

Other desirable features are listed below:

Easy replacement of player terminals when broken;

Graphics must be easy to understand for the patrons;

Help screens should be available and accessible on demand;

The functions of the player touch screen include:

Provide the player with their bankroll amount;

Allow the player to wager, increase or decrease a wager;

Allow a player to repeat the previous wager with a single button press;

Notify the dealer if the player would like to cash out;

Record player actions during the game (for example—hit, stand, double-down, etc.);

Report player actions to the dealer via the split screen; and

Touch screen resolution—All alphanumerics should be easily readable by players and dealers at a distance of three meters or more.

Table Display 330

Description:

The double-sided table display 330 is a two-part system comprising the player-directed display 332 and the pit-directed display 334. These parts are combined in one embodiment into a double-sided display, vertically mounted above the surface of the table. That is, two screens are placed back to back, one facing the pit and one facing the player. The LCD screen (or other display screen) facing the table is used for player information. It may or may not be a touch screen. The pit display, in one example of the invention, is a touch screen that allows for pit interaction with the table to include game selection and pit reports. In other embodiments, the pit can input information via a keyboard that communicates with the game controller or directly with the pit-directed display 334.

Player-Directed Display 332

As an example, a fifteen-inch player-directed display 332 is mounted facing the players on the table in the manner shown in FIG. 11. This display is used to provide information that normally would have been printed on the felt (game, table rules, pay tables, game name, casino logo, legal markings, etc.). It also can include information on a progressive jackpot, casino advertising, or any information that the casino may want to provide to a player.

The table display functionality shall include, for example:

Providing game name and applicable rules;

Display game pay tables;

Provide progressive jackpot information;

Identify winning players;

Allow casino advertising; and/or

LCD (or other display) resolution should be easily readable by players and dealers at a distance of three meters or more.

Pit-Directed Display 334

Description:

For example, the 15-inch pit touch screen is mounted facing the pit. The pit-directed display 334 is used to provide information to a pit supervisor regarding the table. The touch screen allows for initial set-up, game selection and pit reports. Alternatively, data is input through a keyboard in the pit and is displayed on the display.

The pit display functionality includes, for example:

Initial game setup and game options;

Select games;

Open and close the table;

Set table minimum and maximum bet limits; and/or

Interface to the optional jackpot system.

Card Shoe/Shuffler 222

Description:

The card shoe/shuffler or card delivery system 222 must be able to provide the function of electronically identifying the cards that are delivered. Examples of suitable card delivery systems are described in U.S. Pat. No. 7,593,544, issued Sep. 22, 2009, entitled "Manual Dealing Shoe With Card Feed Limiter"; U.S. patent application Ser. No. 11/810,864, filed Jun. 6, 2007, now U.S. Pat. No. 8,070,574, issued Dec. 6, 2011, entitled "Apparatus, System, Method, and Computer-Readable Medium for Casino Card Handling with Multiple Hand Recall Feature"; and U.S. Pat. No. 7,374,170, issued May 30, 2008, entitled "Playing Card Dealing Shoe With Automated Internal Card Feeding and Card Reading." The disclosures of these publications are incorporated herein by reference in their entireties. The card delivery device may read cards internally and then deliver cards one at a time or in sets of cards, with the identity of the individual cards (and all cards in sets), or read cards one-by-one as they are removed from the delivery system and forward that information to the table game controller. With card-reading technology on the table combined with the wagers and player actions, the game can be re-created for player analysis and game tracking.

The card delivery system selected in some embodiments has a "chipless" mode in which the unit accepts commands from the game controller through an I/O port, such as a USB port or cable entry or pinned connection or, preferably, a wireless network access.

The card delivery system functionality for the chipless table may include:

Communicate to the game controller when the first hand or card is pulled for the game controller to lock out the bets on the player touch screens;

Accurately recognize the rank and suit for each card; and/or

Report the card information to the game controller.

Other systems, such as the overhead card imaging systems described above or table-mounted card readers, are other exemplary sources of card rank and/or suit information.

Gaming Table Requirements

When installing the product, the system preferably provides a tabletop structure with all electronics embedded within a layered tabletop. This layered tabletop can be built in a factory and installed on a preexisting support surface such as conventional "H" legs or a crescent-shaped cabinet. The system preferably includes instructions for mounting the tabletop onto the support structure. There may be instances when the player display is mounted closer to the dealer. In this embodiment, all system components are essentially the same as described above, except for the placement of the player displays on the table. Moving the displays closer to the dealer is desirable when the dealer must input information into the dealer portion of the screen, such as when the dealer sets a pai gow poker hand, or indicates the conclusion of play for a particular player, for example.

The tabletop should be covered with plain felt (no printing indicative of only a single game). Printing may be present identifying the casino, sponsors, events, and other information that is not specific to a single game or multiple games. This will allow the operator to change the game in play quickly without changing the table felt.

Allowances should be made for drinks at the table. This should require a high degree of water resistance against spilled drink penetration around the edges of the monitor. This may be done by sealant and/or tight mounting that does not allow liquid penetration. Grooves receiving the screen and overlapping, tight-fitting elements will reduce liquid penetration to enable wiping to prevent rapid significant penetration and damage. It would also be desirable to use player screen/processor units that are liquid tight.

Consideration should be given to how quickly a player touch screen can be replaced in the event that one is damaged. The use of modular screens with modular processors can assist in effecting this benefit.

Optional Multi-Table Pit Computer

Description:

The pit computer gathers the data from multiple tables and stores the information in a database for use by the casino for player analysis, table accounting, etc.

The functionality might include, for example:

Hosting the database for the table; and

Optionally used to host the jackpot system.

Player/Dealer ID Card-Reading System

Description:

The card reader is an add-on that may be used by the dealer, the pit and/or players. Dealers and pit personnel may use cards to authorize play at the table. The card reader can also be used to accept player tracking cards.

Felt Backlight Display (Optional)

Description:

Backlighting under the felt is used to define the areas of the table where cards should be placed by the dealer.

User Interface Graphics

Standards may be summarized at least as follows:

Game-Specific Graphics

The graphics that are specific to a game shall be selected by the game designer.

Dealer Console—Dealer

The general user interface screens for the dealer console shall include:

- Player buys in using cash, chips or a marker;
- Issue a marker;
- Player cash out;
- Player seat change;
- Game screens;

Game controller—pit display:

- Game selection;
- Pit reports; and
- Table handle.

Player Touch Screen:

- Player terminal inactive; and
- Wagering screen.

Hardware Interface

The hardware interface used in communication linkage of the components may be any architecture used to interconnect two pieces of equipment. It includes the design of the plug and socket, the type, number and purpose of the wires and the electrical signals that are passed across them. USB, FIREWIRE®, ETHERNET®, parallel and serial ports as well as COMPACTFLASH™ cards, PCI cards and PC cards are all examples of hardware interfaces (devices connecting to other devices). As noted, wireless communication between elements is generally preferred.

Software Interfaces

Any functional and established software interface may be used, such as selecting those from amongst the ANSI Standard, ISO/IEC Standards, and IEEE Standards. There are well published lists of these standards and include at least:

IEEE Standards

IEEE 694-1994: Microprocessor Assembly Language.

Defines a common assembly language intended to be used for a variety of microprocessor architectures.

IEEE 695-1990: Microprocessor Relocatable Software Formats.

Defines a common format for object files in a small computer environment. The purpose is to enable program construction from modules written in different languages and processed by different compilers.

IEEE 754-1990: Binary Floating-Point Arithmetic.

Defines binary formats and basic operations for floating-point arithmetic. This is commonly referred to as "IEEE floating point" and has become widely adopted in new system implementations.

IEEE 770-1983 (ANSI X3.97): Pascal Computer Programming Language.

Provides a formal specification for Pascal, the first language standardized by IEEE.

IEEE 854-1987: Radix- and Format-Independent Floating-Point Arithmetic.

Specifies alternate floating-point arithmetic formats and operations for implementations that do not necessarily use base 2.

IEEE 855-1990: Microprocessor Operating System Interfaces (MOSI).

Defines a standard OS/program interface (API) for small computers, commonly known as MOSI. Compared to the better-known POSIX® (1003), MOSI is less detailed but spans a broader range of target systems. Includes language bindings for FORTRAN, C, Ada, Pascal, and others as appendices. Also ISO DIS 11685.2.

IEEE 1003.1-1990: POSIX Part 1: System API (Language Independent).

Definition of a standard OS/program interface, commonly known as POSIX®, for UNIX®-like systems. Includes language bindings for C, only, and also ISO 9945-1.

IEEE 1003.1b-1993: Real-Time and Related System API.

Specifies additions to the POSIX® API to support real-time requirements.

IEEE 1003.2-1992: Shell and Utility Application Interface.

Defines functionality for a UNIX®-like shell (command handler) and associated tools.

IEEE 1003.9-1992: Fortran 77 Language Bindings to POSIX®.

Specifies the syntax for accessing the functionality of a POSIX® interface using the FORTRAN language.

IEEE 1224-1993: OSI Abstract Data Manipulation API.

Specifies an API for Abstract Data Manipulation using the OSI (7-layer) Communication Systems model.

IEEE 1224.1: OSI X.400-Based Electronic Messaging API.

Specifies an API for Electronic Messaging Services using the OSI model.

IEEE 1224.2-1993: Information Technology: Directory Services API.

Specifies an API for Directory Services using the OSI model.

IEEE 1275-1994: Boot Firmware.

Defines elements of program functionality to be used in boot (startup) programs in read-only memory.

IEEE 1327-1993: OSI Abstract Data Manipulation C Language Binding.

Specifies a C Language Binding for IEEE 1224.

IEEE 1328.1-1993: Information Technology: X.400-Based Electronic Messaging C Language Binding.

Specifies a C Language Binding for IEEE 1224.1.

IEEE 1328.2-1993: Directory Services C Language Binding.

Specifies a C Language Binding for IEEE 1224.2.

IEEE 1596-1992: Scalable Coherent Interface.

Specifies a physical interconnection scheme for multiprocessors, including aspects which affect their programming.

Computer-related (Information Processing) standards sponsored by the American National Standards Institute (ANSI) are developed primarily by the Accredited Standards Committee X3. These standards are designated X3.nnn.

ANSI Standards

ANSI X3.4-1986: 7-bit American National Standard Code for Information Interchange Base definition for the widely used character code known as ASCII.

ANSI X3.9-1978(R1989): Programming Language FORTRAN

Third revision of the first and most venerable programming language standard. The 1978 version, called FORTRAN-77, is widely implemented. The 1989 version, called FORTRAN-90, is not yet as popular.

ANSI X3.23-1985: Programming Language COBOL

The widely used business-oriented language.

ANSI X3.23a-1989. Programming Languages—Intrinsic Function Module for COBOL.

Extensions to the COBOL standard.

ANSI X3.28-1976(R1986): Procedures for the Use of the Communications Control Characters of American National Standards Code for Information Interchange in Specified Data Communication Links Provides interpretations for the ASCII communication control characters.

ANSI X3.30-1985(R1991): Representation for Calendar Date and Ordinal Date for Information Interchange Specifies how date information should be represented for data exchange.

ANSI X3.41-1990: Code Extension Techniques for Use with the 7-byte Coded Character Set of ASCII Specifies how the ASCII code may be extended.

ANSI X3.43-1986: Representations of Local Time of Day for Information Interchange Specifies how time information should be represented for information interchange.

ANSI X3.51-1986: Representations of Universal Time, Local Time Differentials, and United States Time Zone References for Information Interchange Specifies additional time-related information representations.

ANSI X3.53-1976(R1987): Programming Language PL/I.

Specification for the PL/I language, used primarily on IBM systems.

ANSI X3.64-1979(R1990): Additional Controls for Use with the American National Standard Code for Information Interchange Specifies a large collection of ASCII extensions to control display and printer functionality. In practice a small set of screen editing and cursor positioning codes have been widely adapted; these are supported by so-called ANSI terminals.

ANSI X3.74-1987: Programming Language PL/I, General Purpose Subset

A stripped-down version of the big language.

ANSI X3.113-1987: Programming Language Full BASIC

Specification for the BASIC programming language, which has existed in a vast range of different versions.

ANSI X3.113a-1989: Modules and Individual Character Input for Full Basic

Some extensions to X3.113.

ANSI X3.124-1985: Graphical Kernel System (GKS) Functional Description

Specifications for a hardware-independent method for specifying graphic elements.

ANSI X3.124.1-1985: Graphical Kernel System (GKS) FORTRAN Binding

How to use GKS with the FORTRAN language.

ANSI X3.124.2-1988: Graphical Kernel System (GKS) Pascal Binding

How to use GKS with the Pascal language.

ANSI X3.124.3-1989: Graphical Kernel System (GKS) Ada Binding

How to use GKS with the Ada language.

ANSI X3.159-1989: Programming Language C

Formal Specifications for the C Language (ANSI C).

ISO/IEC Standards

These are information processing standards under the sponsorship of the International Organization for Standardization (ISO) and have generally been developed by the Technical Committee TC97. Standards related to microprocessors under the sponsorship of IEC have been developed by the technical subcommittee SC47B. Since about 1990, information processing standards for both organizations have been managed by the joint technical committee JTC1.

ISO 646-1983: ISO 7-bit coded character set for information interchange

ISO version of the ASCII character set with minor differences.

ISO 1538-1984: Programming Language ALGOL 60

One language that was never standardized in the U.S.

ISO 2022-1982: ISO 7-bit and 8-bit coded character sets—Code extension techniques Techniques for extending the codes of ISO 646 and ISO 4873.

ISO 4873-1979: 8-bit coded character set for information interchange

An extended version of ISO 646, which encodes 8-bits to provide an additional 128 codes.

ISO 6429-1983: ISO 7-bit and 8-bit coded character sets—additional control functions for character-imaging devices Extended display and printer controls for ISO 646 and ISO 4873.

ISO 7498-1984: Open Systems Interconnection—Basic Reference Model

Communication Interfaces

As noted earlier, the communication interfaces may be client-server, master-slave, peer-to-peer and blended systems, with different relationships among the various processors and CPUs as designed into the system.

Any allowable standards (jurisdictionally, by state, county and/or Federal laws and regulations) may be used as the communication standards, with FTP or HTTP standards being the most common and acceptable, but not exclusive, formats used. Each of the computers and processors used may include a display and a number of input buttons, or touch screen functions, and combinations of these, with wired or wireless communication links to enable the player to initiate actions or make responses as required during the game. In a game where the player is playing against the house, the player's hand is displayed face up on the screen as it is dealt and the house hand may be shown face down on the screen. Touch "buttons" can be provided on the screen in addition to or instead of physical buttons. In a further non-limiting configuration, one or more of the players can be located in separate locations, and the player terminals or hand-held devices or player screens in the separate locations can be connected to the controller via communication links (e.g., hardwired or wireless). Standard protocols, software, hardware and processor languages may be used in these communication links, without any known limitation. There are hundreds of available computer languages that may be used, among the more common being Ada, ALGOL, APL, awk, BASIC, C, C++, COBOL, DELPHI®, EIFFEL®, Euphoria, Forth, Fortran, HTML, Icon, JAVA®, JAVASCRIPT®, Lisp, Logo, MATHEMATICA®, MATLAB®, Miranda; Modula-2, Oberon, Pascal; PERL®, PL/I, Prolog, PYTHON®, Rexx, SAS®, Scheme; sed; Simula; Smalltalk; SNOBOL; SQL; VISUAL BASIC®, VISUAL C++®, and XML.

Any commercial processor may be used either as a single processor, serial or parallel set of processors in the system. Examples of commercial processors include, but are not limited to MERCED™, PENTIUM®, PENTIUM II XEON™, CELERON®, PENTIUM PRO™, EFFICEON®, ATHLON®, AMD®, and the like.

Display screens may be segment display screens, analog display screens, digital display screens, CRTs, LED screens, plasma screens, liquid crystal display screens, and the like.

The initial expectation is that the chipless table will be considered a table game and regulated as such. However, all of the hardware and software must comply with the regulatory requirements for a table game. The table with all of the components must comply with UL® and CUL requirements. Compiled computer code when available for display has a statement on the first page that "the code is confidential and is the proprietary property of Shuffle Master, Inc." per NRS 603.010 et seq. and NRS 600A et seq.

a. Creative organization and sequencing should be unnecessary to the lock and key function.
b. Arbitrary programming instructions may be used and they may be arranged in a unique sequence to create a purely arbitrary data stream to create a level of security in the system.
c. All computer code on the system should be ciphered.

Terminology for on screen display items may include at least some or all of:

Player balance
Amount bet
Win amount
Recall previous bets
Cash out
Clear all bets
Bankroll
Wager—value only near chips
Value only near chips
Rebet Special requirements that may be on the card delivery systems (or other delivery system) include:

Report button presses to game controller.
Use lamps and LCD display for results (dealer information).

Special requirements that may be on the I-DEAL® shuffler system (or other shuffler system):

Accepting configuration from the game controller.
Report button presses to game controller.

The game controller in one embodiment is programmed with a rule that a game cannot commence until at least one player has a non zero balance and preferably that no games are allowed to be played when no bets have been placed. The system is configurable to account for varying independent casino rules and various gaming regulations. Embodiments of the system include error recovery procedures. Specifications of popular side bets are incorporated into the coding to allow implementation. Multi-game functionality is provided. Embodiments of the proposed system allow for progressive jackpots.

Exemplary player displays are fifteen-inch 1024×768 pixels or dots. The touch screen overlay in one example is preferably about fifteen-inch 1024×768 pixels or dots. The size and resolution of a preferred dealer display and touch screen is 6.5 inches and from 512 to 1024 pixels per line (or higher definition). The screen resolution is a matter of cost and image quality resolution.

Figure 13:
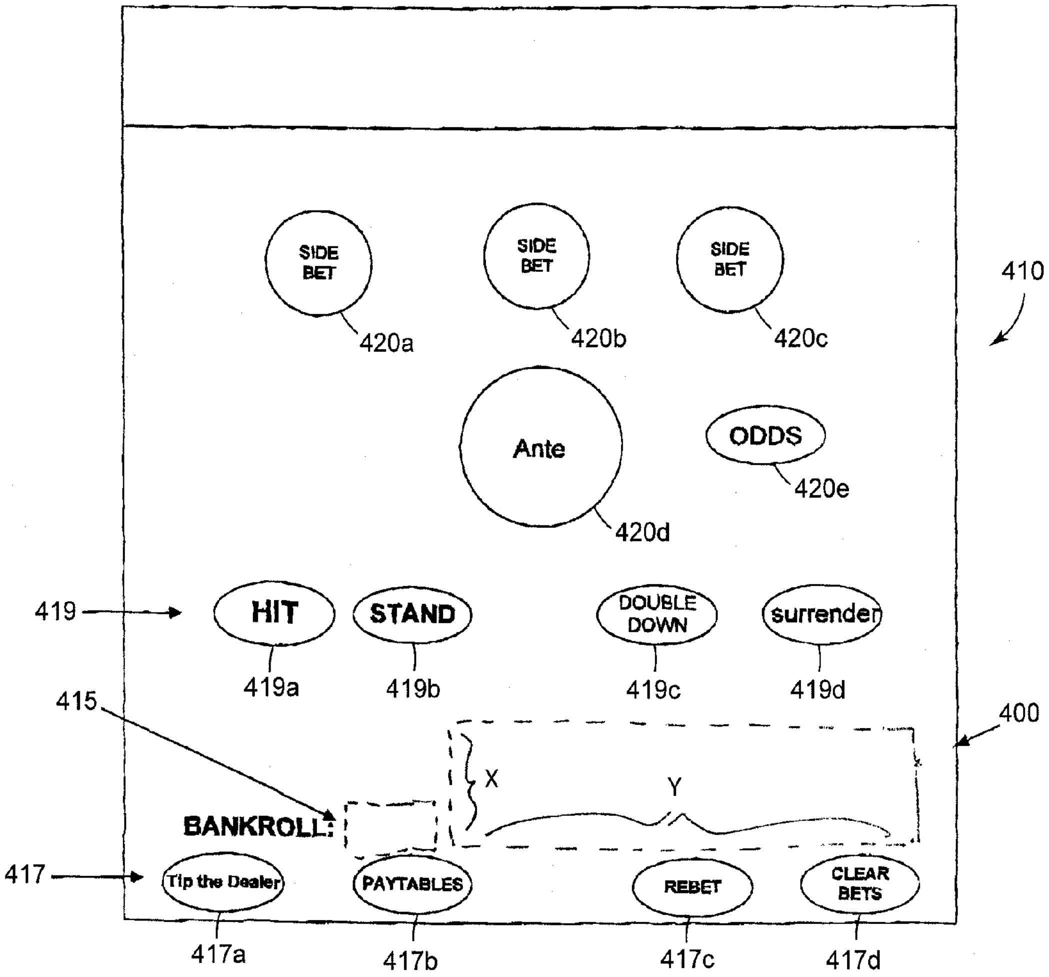
FIG. 13 shows a touch screen layout for player controls and inputs, without stacks of chips or chip value locations being specifically shown.

FIG. 13 depicts an example of an enabled touch screen layout 410 with associated chip tray field 400 prior to a buy-in and an allocation of relative credits in a bankroll field 415. In a preferred embodiment, it is important to note that the chip tray field 400 is depicted without a physical/visible line of separation from other relative fields on the screen such as, but not limited to, a player decision field 419, including options 419*a*-419*d*, and a player control field 417. However, the chip tray field 400 has predetermined non-visible dimensions that limit players from stacking chips outside of the predetermined field and, therefore, interfering with other relative fields on the touch screen interface 410. In other words, players cannot stack one hundred $1 chips past predetermined dimensions X, Y of the chip tray field 400 and into other function fields. The one hundred chips in the $1 virtual chip stack are available for play, but the $1 virtual chip stack does not exceed a predetermined height and/or a number of chips displayed within the chip tray field 400.

When a chip stack exceeds a predetermined height and/or number of chips within a value chip stack, the chips default to the next highest and/or lowest value chip stack depending on the credit amount displayed in the bankroll field 415, wherein the chip stacks automatically balance relative to the credit. In other embodiments, the value of the displayed chips may be less than the bankroll amount and the player decides what portion of the bankroll is shown as chips. If the system exceeds a limit for displayable chips, higher value chips will automatically be displayed or an overage amount will be transferred to the bankroll field 415 and special highlighting can be provided to show that the overage (above the amount displayed) is present in the bankroll field 415.

An alternative miscellaneous chip stack (not shown) may be provided for odd chip amounts and/or chip amounts exceeding the available chip value field limits. For example, the system colors-up chips to the highest available chip value field. Chips that exceed the available space in the default chip value fields will be stacked in a miscellaneous/mixed stack in colors relative to their value but not relative to a value field, wherein a $500 chip, a $100 chip, and a $50 chip might appear in the one miscellaneous/mixed chip value field as a credit overflow.

Odd credit valued without a relative chip value is not necessarily depicted in the chip value fields. However, the odd credit values are displayed as available credit in the bankroll field 415. For example, an odd credit value may be of a lower value than the lowest available chip value field such as $0.50, etc.

An alternative embodiment of a buy-in default chip display includes a base default chip value, wherein a buy-in is displayed in the default chip value field first. However, if the default chip value field is filled to a maximum level, the system automatically defaults to the second highest and/or lowest chip value field (depending on the amount of the buy-in), wherein, as the second highest and/or lowest chip value field is filled to a maximum level, the system defaults to the third highest and/or lowest chip value field, etc., until the chip value fields are filled and/or reflect the bankroll field 415 amount relative to a player's buy-in. Overflow bankroll field 415 amounts are displayed in the mixed chip value field as required, and odd credit values are displayed in the bankroll field 415. It should be noted that base default chip settings are left to the discretion of the casino customer, and may vary according to game type, casino customer preference, and/or table limits.

Another embodiment of the virtual chip fields discloses a "halo" such as, but not limited to, an ellipse displayed at and/or around the perimeter surface and/or perimeter of the lower surface of a base default chip value stack and/or field. The "halo" feature highlights the base default chip value stack currently enabled by the system.

Yet another embodiment discloses a "shadow" in disabled chip value fields prior to a chip fill, a buy-in, coloring up and/or down, etc., with the relative value of the chip value field displayed within the "shadow," wherein the shadow is a predetermined shape such as, but not limited to, an ellipse, box, and/or circle. The "shadow" feature provides players with value chip information relative to each available chip value field prior to a chip fill.

Another embodiment discloses a player's option to change a base default chip value to a preferred base default chip value after a first buy-in is displayed in the initial default chip setting. It is preferred the player only "color-up" or exchange chips to a higher chip value field when changing the base default chip value. Once a player colors-up a default chip value to a higher base chip value field, it is preferred the "halo" will appear on said higher base chip value field. The feature allows players to play with preferred higher value chips as a base chip value throughout their gaming experience. Therefore, any subsequent buy-ins will appear in the player's "new" highlighted base chip value rather than the default base chip value as long as the player's base chip value is a higher value than the default base chip value. This provides each player with a customizing feature that allows them to wager with preferred denominations.

A play is allowed to default down to the programmed chip default value if desired. For example, if the programmed default chip value is $5 and a player decides to default up to a higher default chip value, such as $25, the player is allowed to default back down to the programmed default value of $5 at any time during play.

Another embodiment would provide the chip fields devoid of chip value information prior to buy-ins and enablement and the chip value would automatically be selected based on an initial amount of credit, or could be selected by either player input or dealer input. An alternative embodiment is a virtual chip tray field with visible chip tray field borders (not shown).

Figure 14:
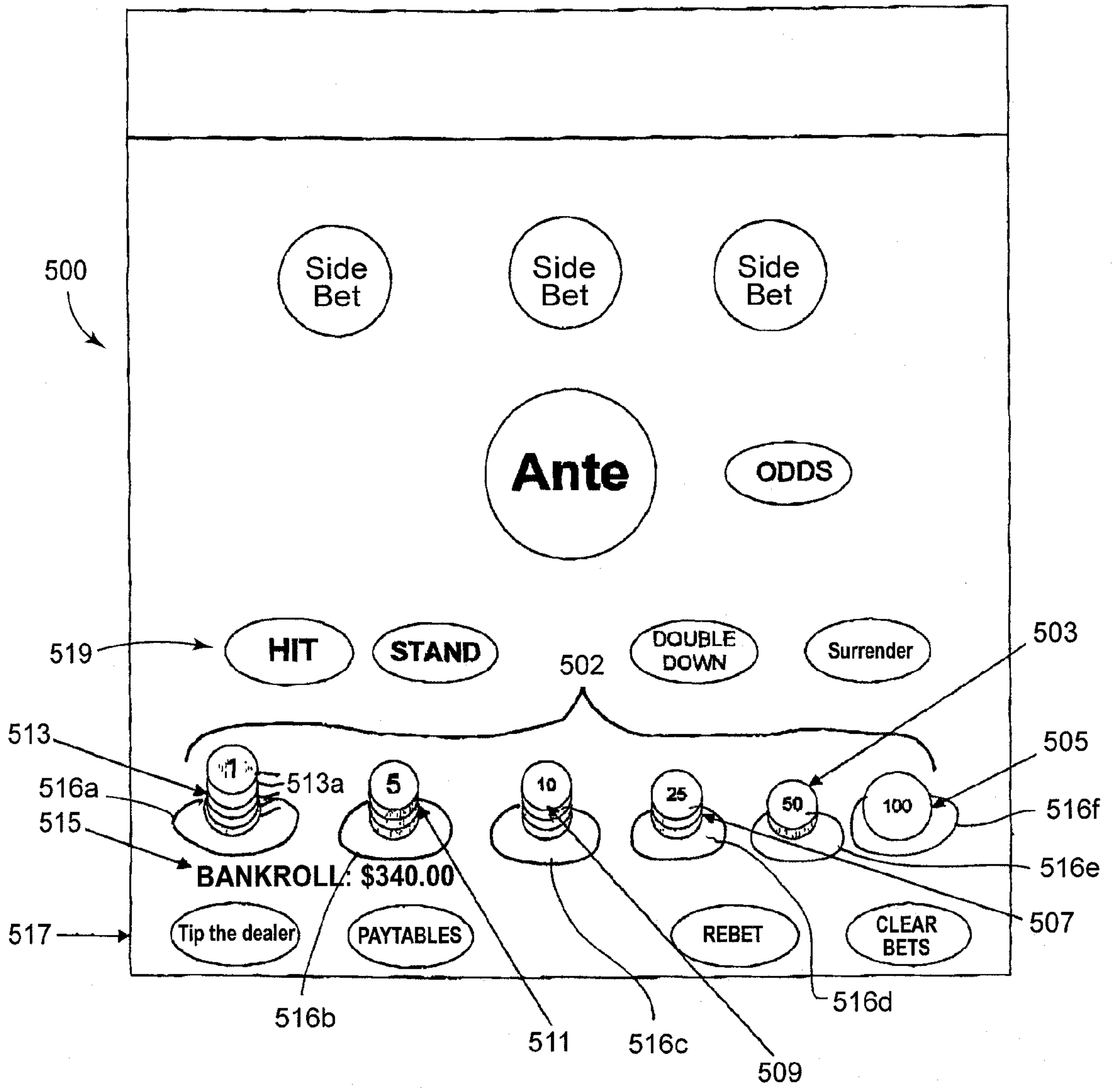
FIG. 14 shows a touch screen layout for the player controls and inputs of FIG. 13, with individual stacks of chips or chip value locations being specifically shown on the touch screen layout.

FIG. 14 depicts an example of an enabled touch screen interface 500. The enabled touch screen interface 500 has the associated buy-in credits showing in a bankroll field 515 along with a plurality of chip value locations 516*a*-516*f* showing in a chip tray field 502. It should be noted that this active touch screen is showing all value chip fields as enabled for the purposes of example.

Figure 15:
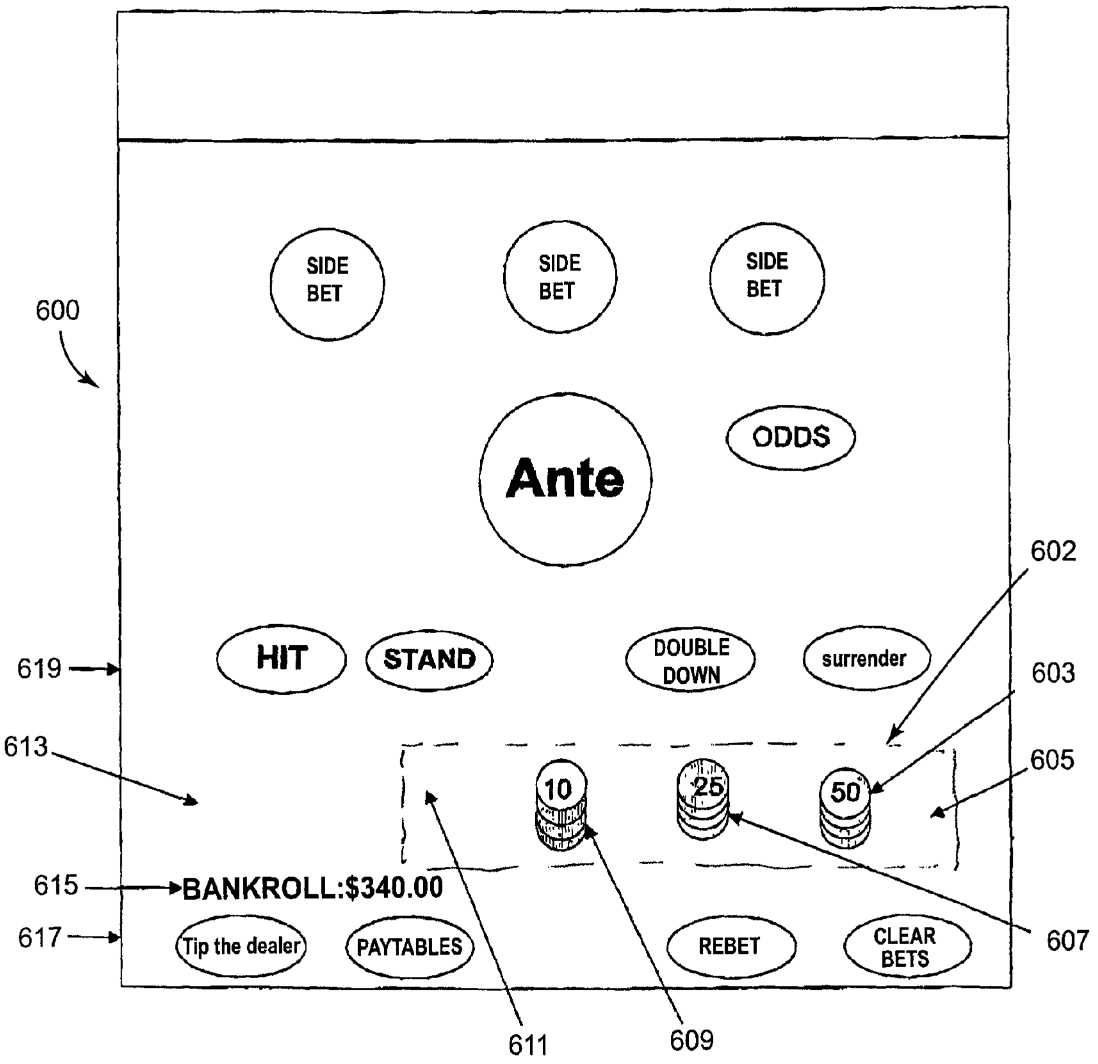
FIG. 15 shows the touch screen layout for the player controls and inputs of FIG. 13, with individual stacks of chips and less than all available chip value locations being specifically shown on the touch screen layout.

FIG. 15 depicts an example of an enabled touch screen interface 600, wherein only three chip value fields 603, 607 and 609 of six available chip value field segments are enabled. It is preferred the chip value field segments are enabled when a player relocates at least one virtual chip into an alternate chip value field of equal, greater, and/or lesser value. Preferably, players use hand motions such as tapping and/or dragging a virtual chip left and/or right into a preferred value chip field. Please note the virtual chip denominations and default chip values may vary and are relative to table limits and/or the type of game currently implemented, player preferences and even dealer/house control. The virtual chip denominations and/or default chip values featured in this document are for the purpose of example only.

A chip tray field 602 of a buy-in screen initially exhibits a bankroll field 615 credit amount ($340.00) in a selected group of high-value default chip field segments, wherein the highest value default chip fields in the present example are a first default value of $50, a second default value of $25, and a third default value of $10. For the purpose of example, a first buy-in of $340.00 shows four chips in the $50 chip value field 603, four chips in the $25 chip value field 607 and four $10 chips in chip value field 609. A preferred alternative example of a buy-in screen (not shown) might show three chips in a $100 chip value field 605, one chip in the $25 chip value field 607, one chip in the $10 chip value field 609, and one chip in the $5 chip value field 611. The preferred embodiment and the preferred alternative embodiment provide a player with discernible default chip information relative to a first buy-in and/or an additional buy-in(s) that is simple to evaluate, and therefore less confusing for the player. A more detailed description of a buy-in default chip process is explained later in more detail.

Once the player's buy-in is allocated to the player's touch screen interface 600, the buy-ins show in the bankroll field 615 as well as in the preferred chip value field segments. Subsequently, the player is able to manipulate the value chips into a desired denomination, plurality of said denominations, and/or combinations thereof, relative to said player's available credit.

An additional alternative embodiment of buy-in chip fields is depicted in FIG. 14. Preferably, the touch screen interfaces 500 and 600 depict enabled fields and relative field data in color pixels. Therefore, virtual chips are depicted in colors specific to each chip stack's denomination. However, color preferences do vary and are relative to a casino's chip color preferences. Therefore, value chips do have a color relative to denomination, but the color of choice is discretionary.

The Preferred Embodiment of Chip Value Exchanges

Figure 15A:
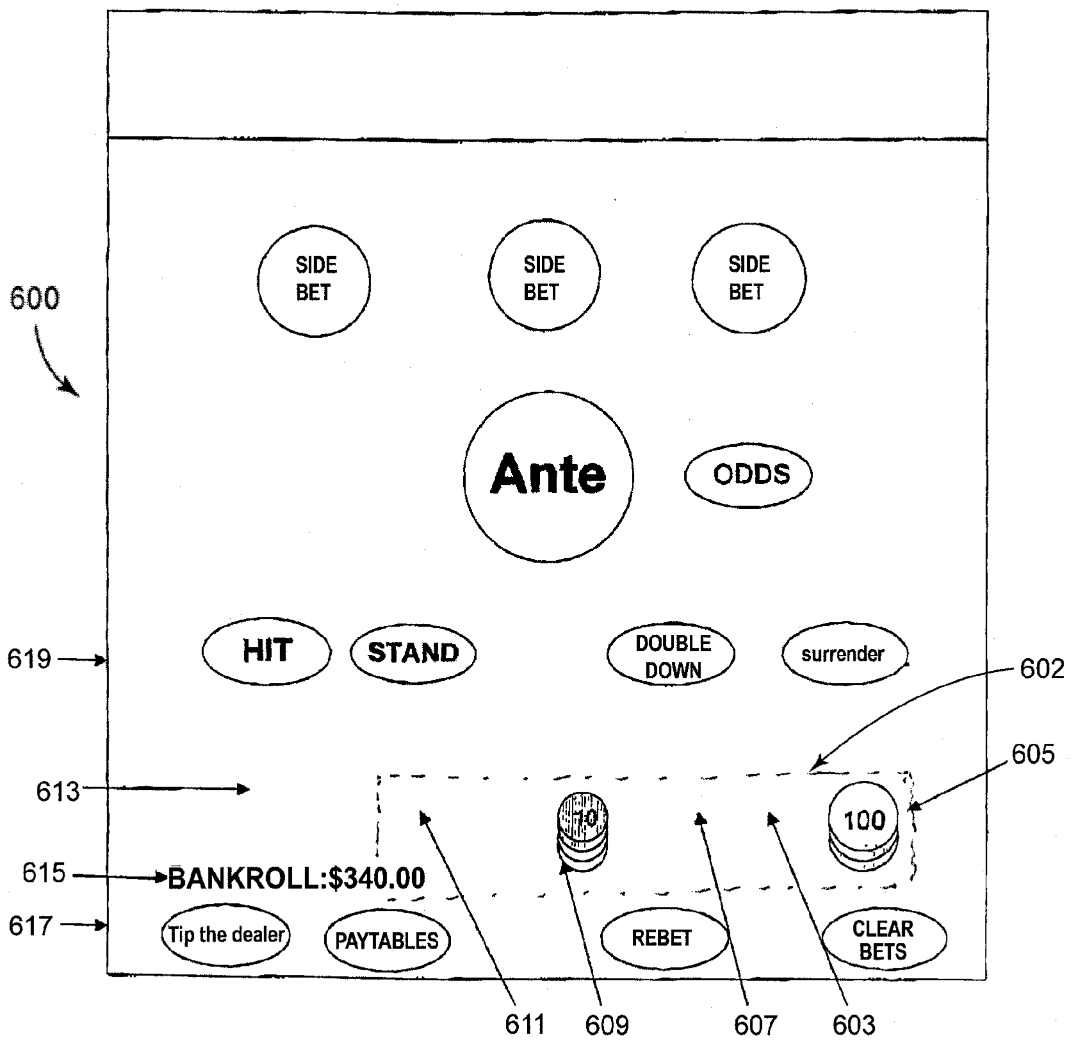
FIG. 15A shows the touch screen layout of FIG. 13 with $25 denomination and $50 denomination chips exchanged for $100 denomination chips.

Referring to FIG. 15A, the bankroll field 615 exhibits $340.00 in credit. The chip tray field 602 is exhibiting $300 in the $100 chip value field 605 and $40 in the $10 chip value field 609. It should be noted that the remaining available chip value fields 603, 607, 611 and 613 are not necessarily enabled in FIG. 15A. A player enables chip fields by using hand motions such as, but not limited to, tapping and/or dragging a chip value left and/or right of an enabled chip field.

The Process of Value Chip Conversion/Swapping

Referring to FIG. 15A, the chip tray field 602 is presently showing three $100 virtual chips in the $100 chip value field 605 and four $10 virtual chips in the $10 chip value field 609. The total value of the virtual chips is equal to $340 and the amount of player credit is shown in the bankroll field 615.

1) A player enabled the $100 chip value field 605 by tapping and exchanged for $50 chips by tapping and/or dragging a one $100 value chip left into the $50 chip value field 603. The enabled $100 virtual chip is automatically converted into two $50 virtual chips, wherein the two $50 virtual chips subsequently appear in the enabled $50 chip value field 603 (not shown) and one fewer $100 chip is displayed in $100 chip value field 605. Two $50 virtual chips in the $50 chip value field 603, and four $10 virtual chips are displayed in the $10 chip value field 609.

2) The player taps and/or drags a second $100 virtual chip into the $50 chip value field 603, wherein the process of conversion is repeated. The chip value field 602 now has one $100 virtual chip in the $100 chip value field 605, four $50 virtual chips in the $50 chip value field 603, and four $10 virtual chips in the $10 chip value field 609.

3) The player taps and/or drags the third remaining $100 virtual chip into a $25 value chip field 607. The $25 chip value field 607 is enabled and the last $100 virtual chip is subsequently converted into four $25 virtual chips.

FIG. 15 shows the final chip field configuration for the present conversion, wherein the chip tray field 602 is presently showing four virtual $50 chips in the $50 chip value field 603, four $25 virtual chips in the $25 chip value field 607, and four $10 virtual chips in the $10 chip value field 609. The remaining chip value fields 605, 611, and 613 remain dormant until enabled.

A plurality of lesser first chip values is converted into a higher second chip value(s) in a substantially identical process, with one exception. The sum of the lesser first chip values contained within the first chip value field must be equal to and/or greater than the higher second chip value(s) contained within the second chip value field. If the sum of the plurality of the first chip values is less than the desired second chip value field, the system aborts the exchange attempt and the plurality of lower first value chips remain within their present first chip value field. In other words, a player is unable to convert two $1 chips into one $100 chip.

The total in the bankroll field 615 remains constant during the conversion activity unless the player places a wager with a virtual value chip, or requests an additional buy-in during the progress of a game, wherein the data displayed in the bankroll field 615 and the chip tray field 602 automatically adjusts to reflect bankroll field 615 credit updates on the system.

FIG. 14 displays an alternative chip conversion activity, wherein all chip value fields 503, 505, 507, 509, 511, and 513 are presently enabled. Players may participate in the "chip conversion" activity as desired. The number of chip stack configurations is relatively limitless and is left to the discretion of the player. Value chips are converted from lower chip values to higher chip values and vice versa with no present restrictions.

Figure 17:
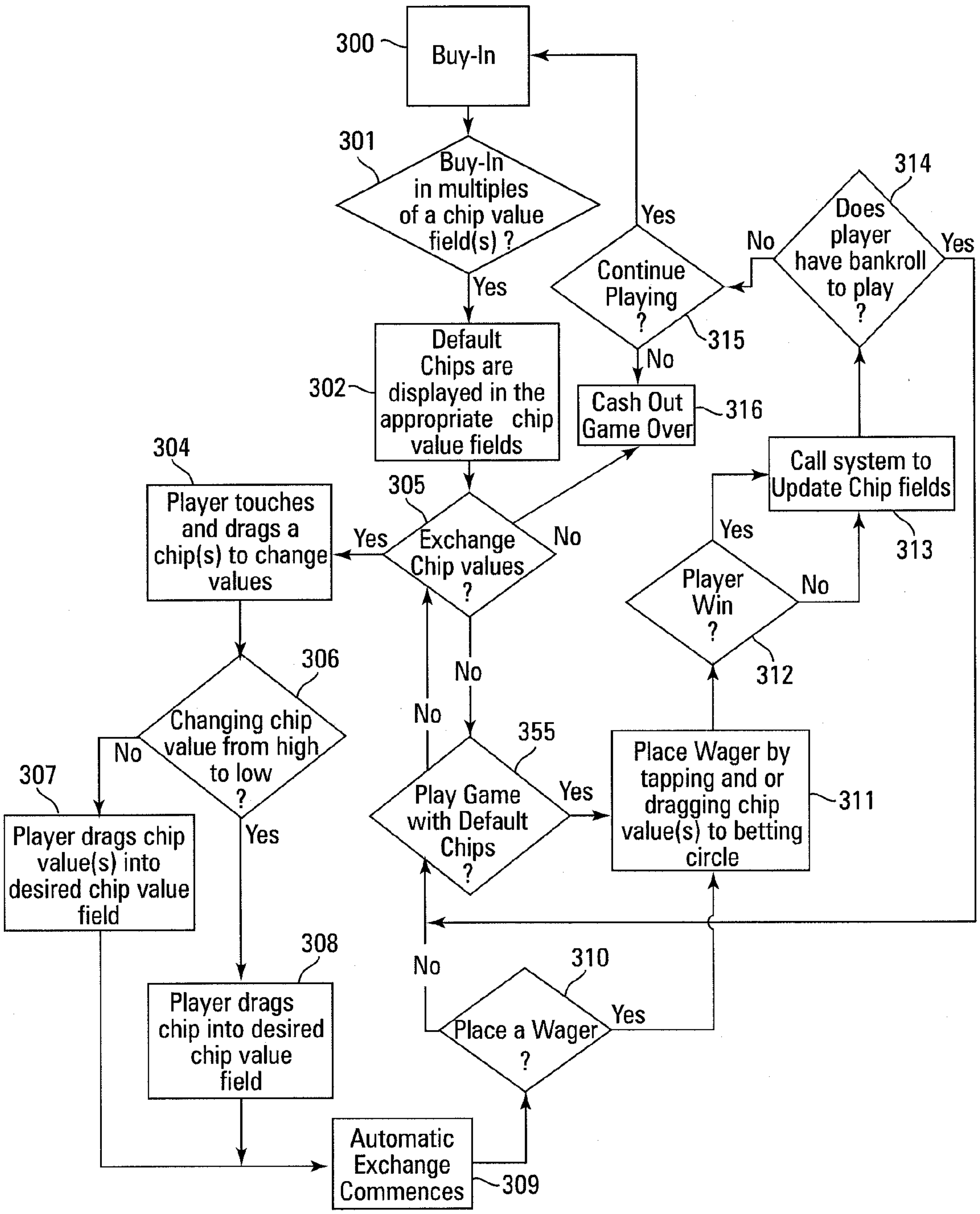
FIG. 17 shows a flow diagram for multi-step, multiple option play of the system and process of the technology described herein.

FIG. 17 shows a flow diagram for an exemplary multistep, multiple option play of the system and process of the technology described herein. A flow diagram of the process action steps is depicted in the figure.

1. The first action is a player buy-in 300.
2. The next action is a system analysis of chip field multiples 301 relative to the buy-in amount.
3. The system updates the chip fields and the default chips are displayed in the appropriate chip value fields 302.
4. The system awaits a player decision to exchange or not to exchange chip values 305.
5. If the answer is yes, the player touches and drags a chip(s) to another chip field segment to exchange virtual chips 304.
6. Are chips exchanged from high to low 306?
   a. If the answer is yes, the player drags chip(s) into the desired chip field 308 and automatic exchange commences 309.
   b. If the answer is no, the player drags chip(s) into the desired chip field 307 and automatic exchange commences 309 if credit is sufficient.
7. The player's turn arrives in the game and the player must decide 310 to either place a wager 311 or cash out and/or end his/her game 316.
8. If the player chooses to place a wager 311, the outcome of the game 312 is automatically calculated. The player touch screen PC calls the system to update the chip fields 313.
9. If the player has a sufficient bankroll to place a minimum wager 314 and wants to continue playing, the process continues at step 355.
10. If the player needs to buy in to continue playing 315, the process continues after buy-in at step 300.

FIG. 13 shows a touch screen interface 410 for player control fields 417 and player decision field 419, and without stacks of chips or chip value field segment locations being specifically shown in the chip tray field 400. The vacant bankroll field 415 is also shown. The amount in the bankroll field 415 would be input either by direct player credit, account debit, currency, ticket, coin or token input into a receiver system (not shown) as is often used in other casino table systems. With respect to player input of wagers or accessing wager information, the particular touch screen interface 410 shown has three separate side-bet option positions **420*a*, 420*b* and 420*c*, as well as an ante bet position 420*d* and an odds bet position 420*e*. Other player bet options or functions that are not shown, but are within the skill of the artisan based on the enabling description and disclosure herein include progressive wagers, play wagers, bad beat wagers, pot wagers, and any other wagering function or type known in the art. Also shown on the player control field 417 are tip the dealer function area 417*a*, available pay table activation/call-up contact area 417*b*, rebet action or game contact area 417*c* and clear bets contact area 417*d***. Other specific player functions that are not shown may be provided, such as help buttons, strategy call-up, game rules call-up, and other features known to be useful in the art.

FIG. 14 shows a touch screen interface 500 for player controls 517 and player inputs 519, and with individual stacks of virtual chips (e.g., 513) and chip value locations **516*a*-516*f* being specifically shown on the touch screen interface 500. Each of the individual stacks of virtual chips (e.g., virtual chips 513) shows a virtual perspective view of the individual stack (e.g., virtual chips 513) so that the appearance of the number of chips in the stack can be viewed by seeing the sides 513*a* of the individual chips in the stack of virtual chips 513. Separate stacks for $1.00 virtual chips 513, $5.00 virtual chips 511, $10.00 virtual chips 509, $25.00 virtual chips 507, $50.00 virtual chips 503 and $100.00 virtual chips 505 are shown. As can be seen, at least two of these denominations ($10.00 and $50.00) are unusual denominations for U.S. casino chips. Because of the electronic nature of the system, any value of chip, in addition to or instead of the standard U.S. chip denominations of $1.00, $5.00, $25.00, $100.00, $1,000.00 and $10,000.00), may be used. At certain gaming tables, $2.00 and $3.00 maximum wagers are used, and the use of such unusual denominations is facilitated by this virtual system and the provision of denominations of such unusual values (e.g., $3.00 virtual chips) can be provided for and exchanged according to the technology described herein. It is also possible for player input controls to designate the denominations of individual stacks. This can be done by touch screen contact of a site (with single, continuous or multiple contacts) and activating a separate player control, such as an up-down arrow, touching both the rebet action area 417***c* and clear bets contact area 417*d* (FIG. 13) at the same time, and the like. In this way, the denominations of the stacks can be controlled by the player, as well as controlling the number of chips in each stack by the change value step later described in greater detail.

FIG. 15 shows a touch screen interface 600 for player controls and inputs, with individual stacks of chips in the chip value fields 603, 607 and 609 and less than all available chip value locations 605 and 611 being specifically shown on the touch screen interface 600. Player functions 617 and wager controls 619 are also shown, as is the bankroll field 615.

Figure 16:
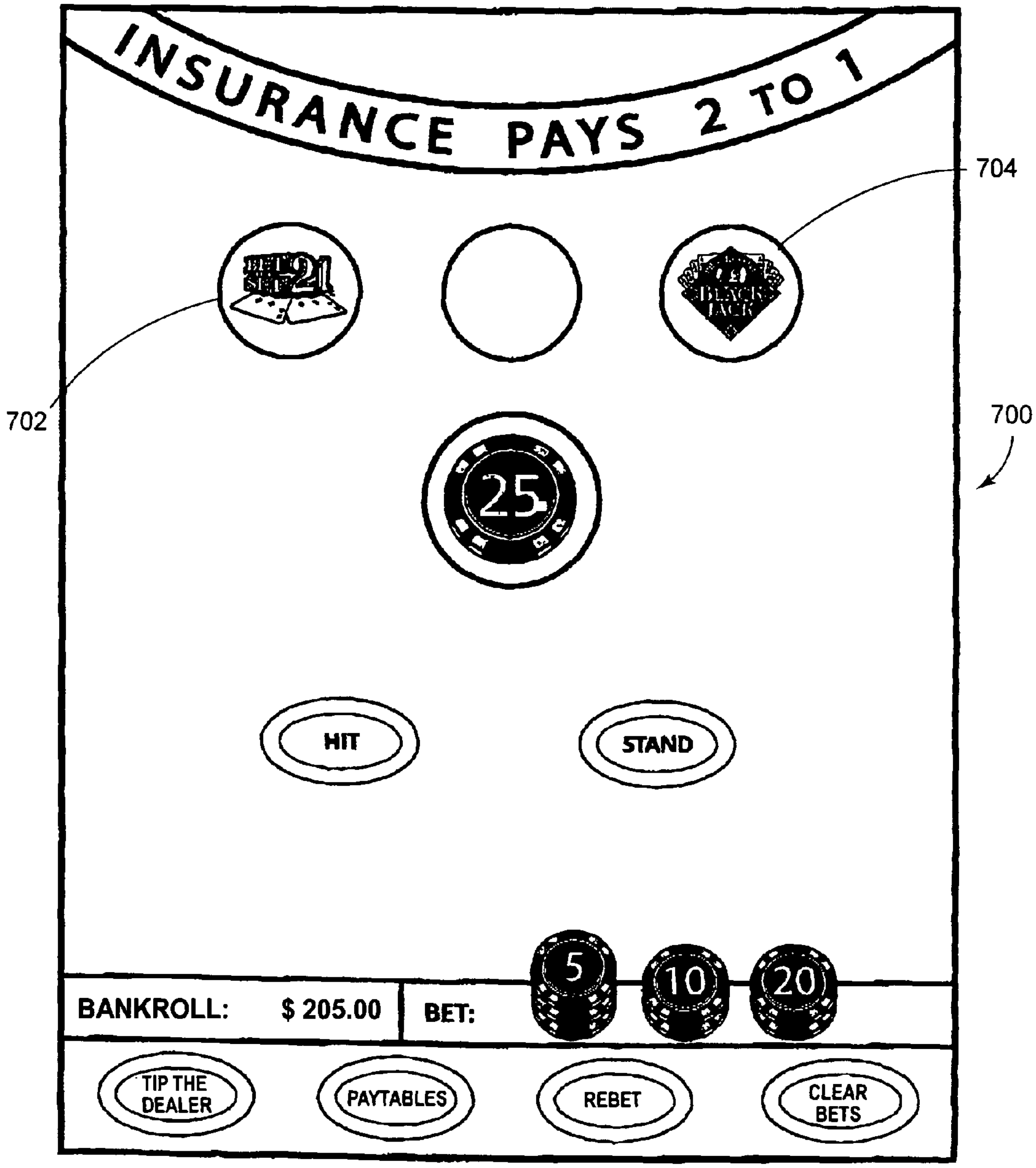
FIG. 16 shows a touch screen layout for player controls and inputs of a blackjack game that offers multiple side wager options.

FIG. 16 shows a touch screen interface 700 for a blackjack variant game with side-bet areas 702, 704 provided for player controls and inputs, with individual stacks of $5.00, $10.00 and $20.00 chips and less than all available chip value locations being specifically shown on the layout.

Figure 18:
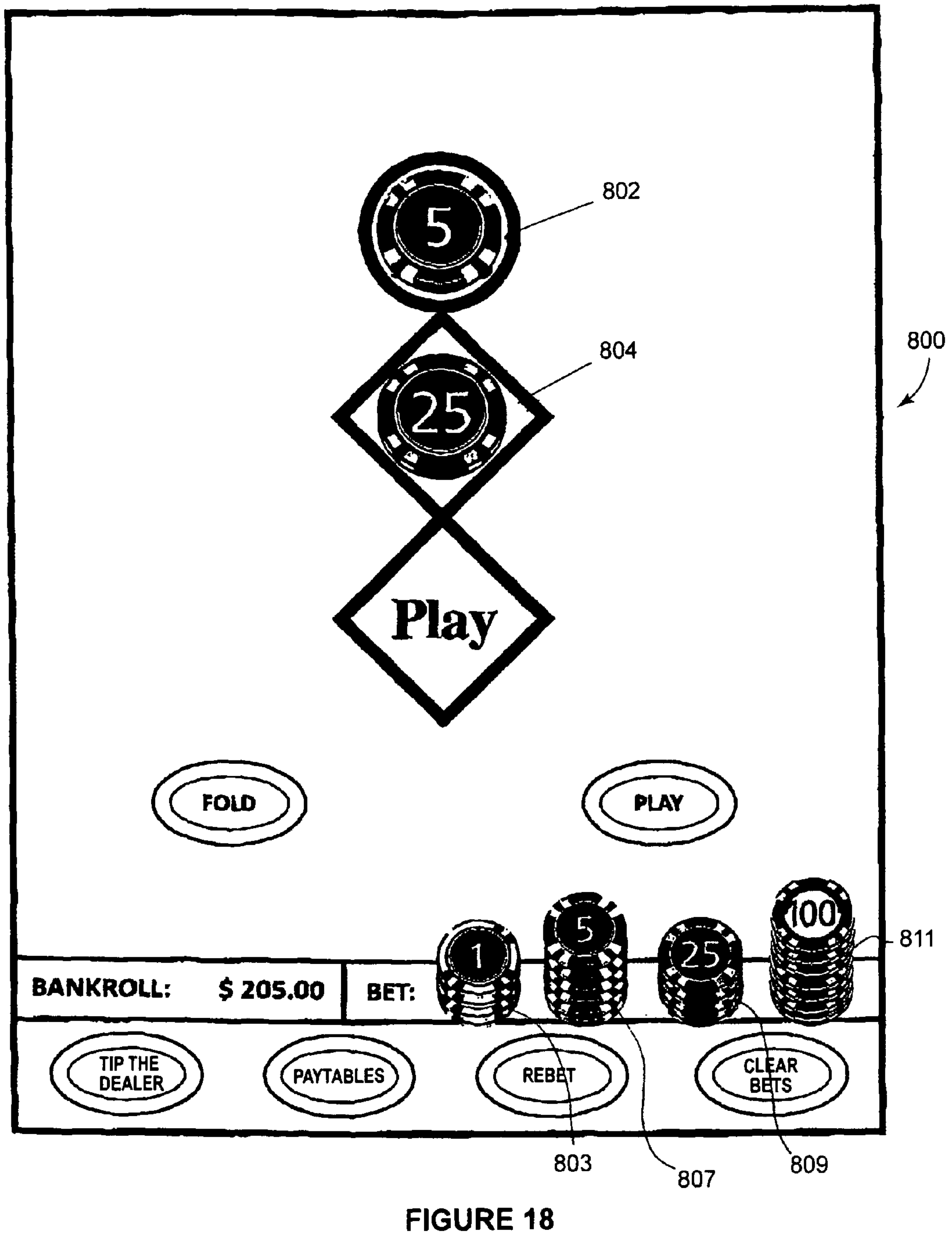
FIG. 18 shows a screen display illustrating wagers made in a game of THREE CARD POKER®.

FIG. 18 shows a touch screen interface 800 for THREE CARD POKER® game with player controls and inputs, and with individual stacks of chips 803, 807, 809, and 811 on the touch screen interface 800.

Figure 19:
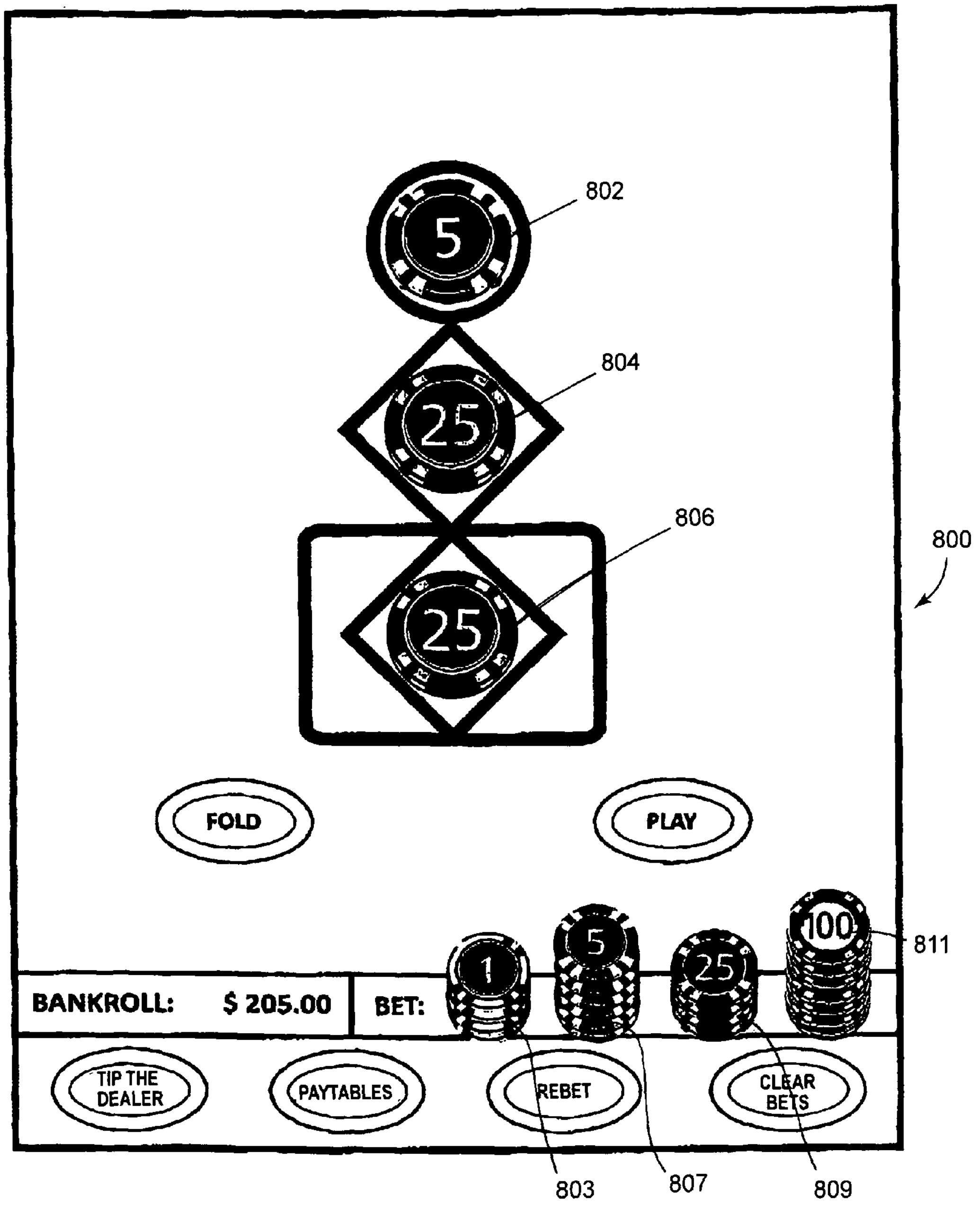
FIG. 19 shows a screen shot of the wagers made in FIG. 18 plus an additional wager in a game of THREE CARD POKER®.
Figure 19A:
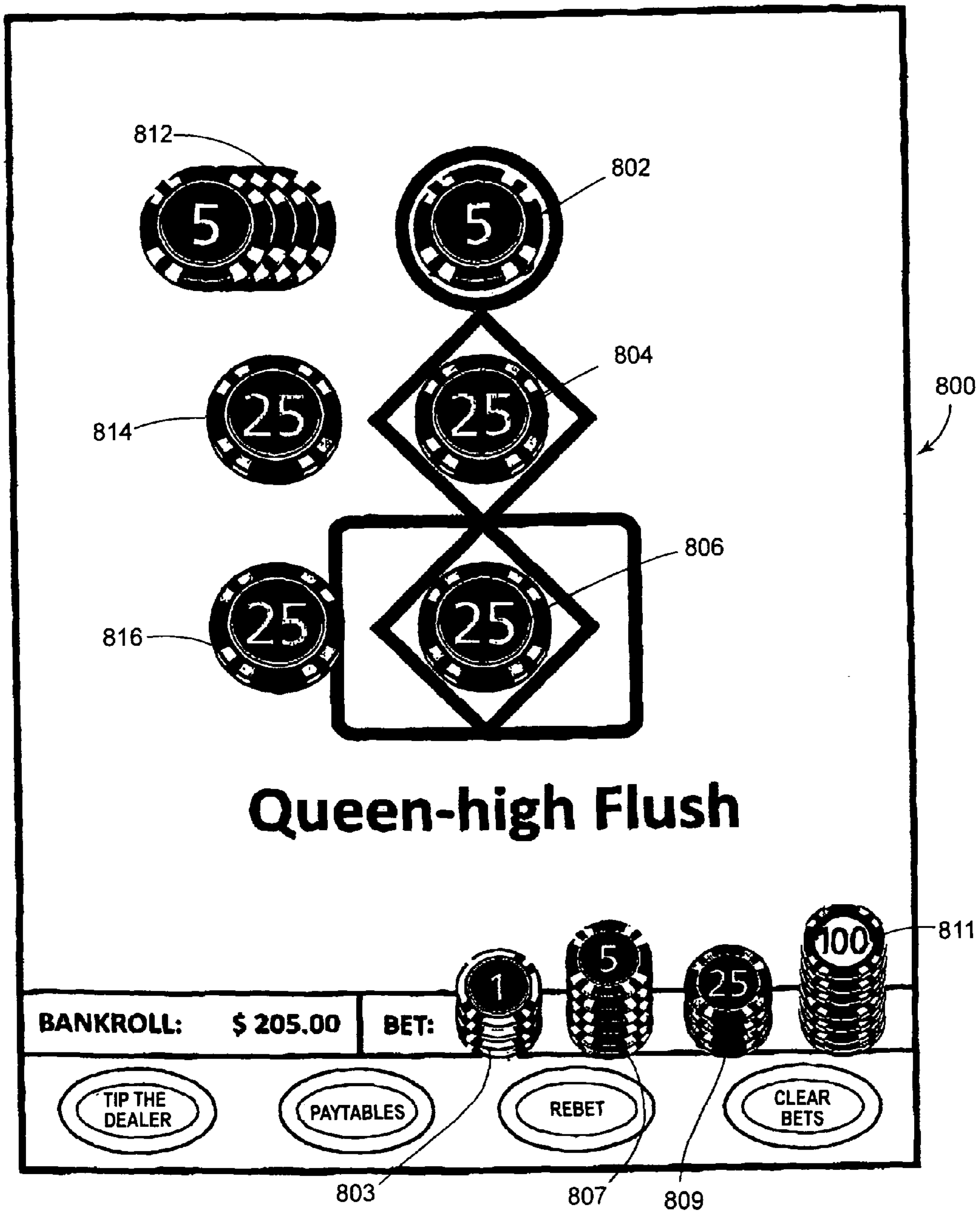
FIG. 19A shows payouts made on the three wagers illustrated in FIGS. 18 and 19.

FIGS. 18, 19 and 19A show a sequence of events at a single player position based on wagers in THREE CARD POKER® game. In FIG. 18, an initial wager of $5.00 on a "pair plus" or better wager is shown in area 802 and a $25.00 ante wager is shown in area 804. A "play" wager is not placed (usually) until after a player views his cards. In FIG. 19, after the player has received his three cards (not shown), the required matching play wager of $25.00 is shown in area 806. In FIG. 19A, after dealer's cards (not shown) have been revealed and the player's cards (not shown) have been ranked (as a queen-high flush), the wagers are shown as resolved, with the queen-high flush on the pair plus or better wager paid at 5:1 in area 812, and the ante and play wagers paid at 1:1 in areas 814 and 816, respectively (as the dealer hand rank was beaten).

Figure 20A:
FIGS. 20A, 20B and 20C illustrate information that can be displayed in response to activating the "pay tables" control.
Figure 20B:
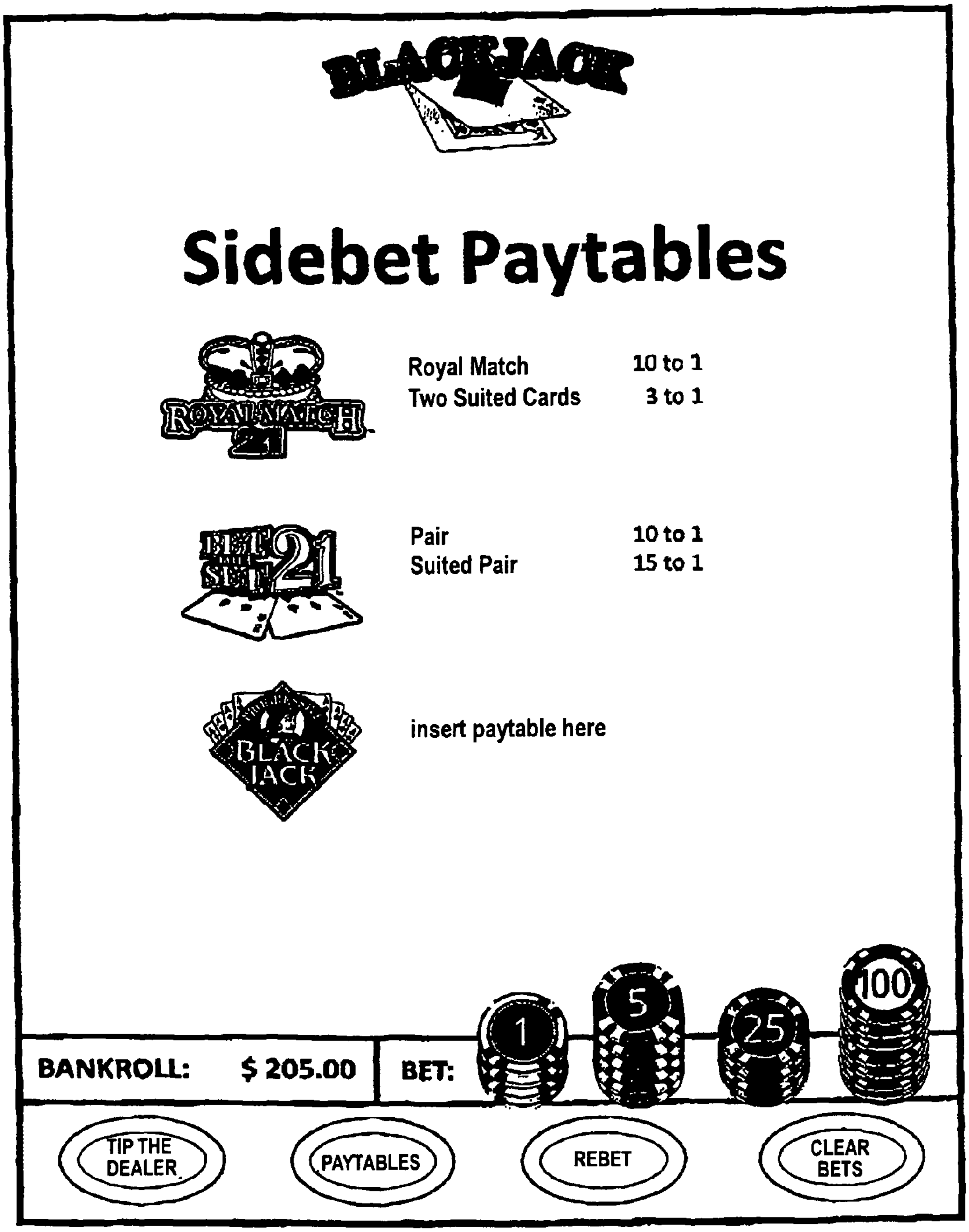
Figure 20C:
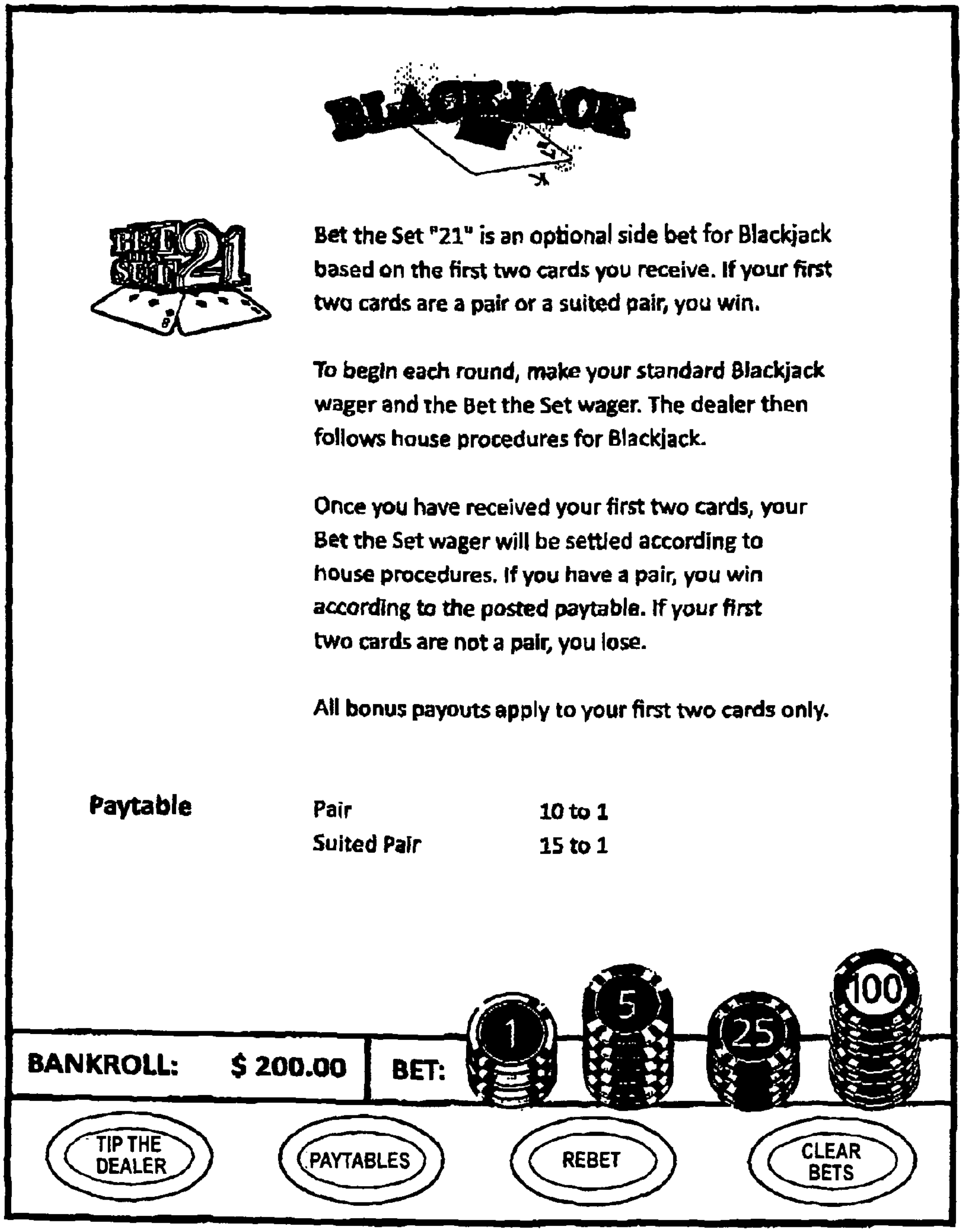

FIGS. 20A, 20B and 20C show different screens that can be called up by a player touching and activating the pay table activation/call-up contact area 417*b* (FIG. 13).

Figure 21A:
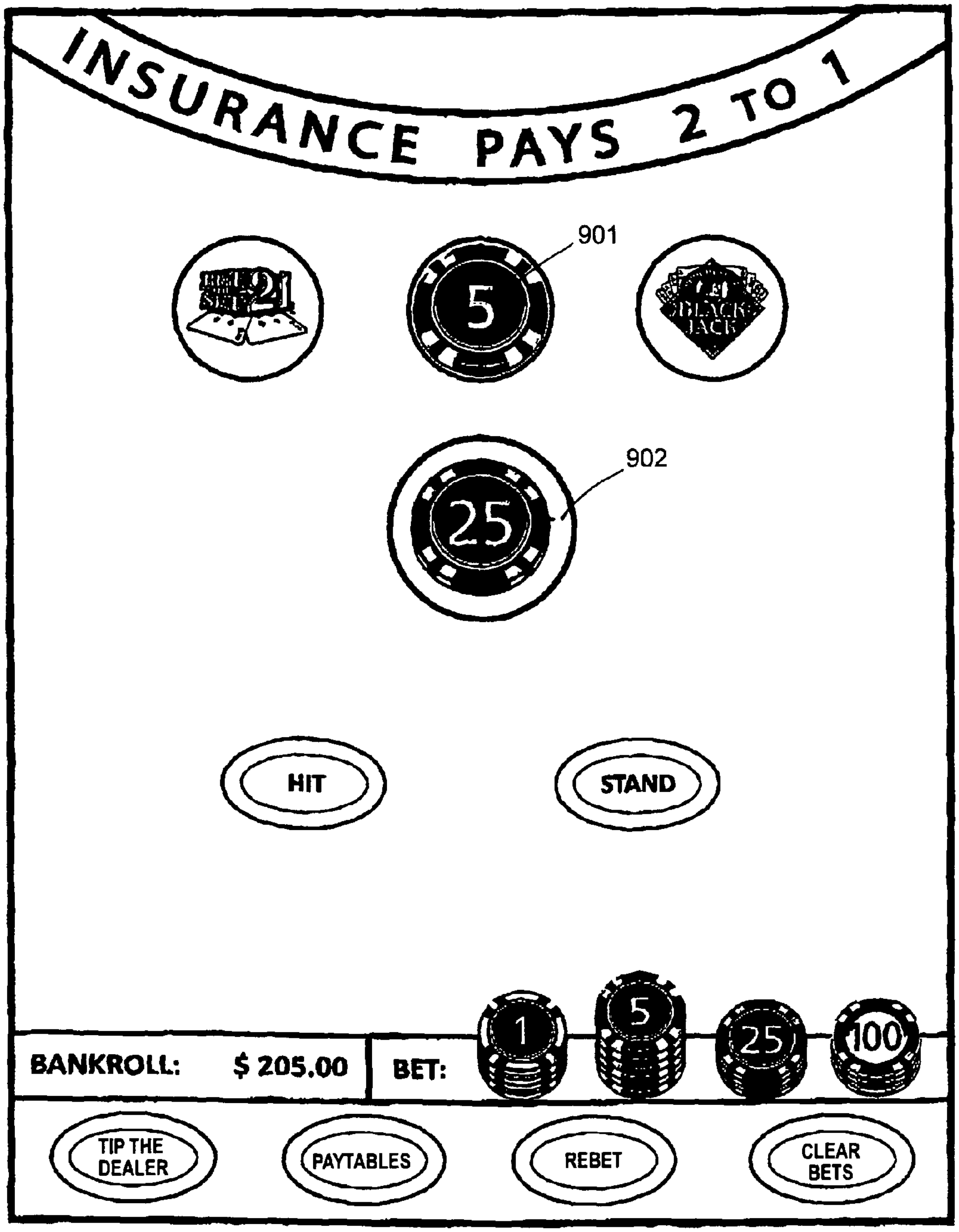
FIG. 21A shows various wagers made electronically in a game of blackjack.
Figure 21B:
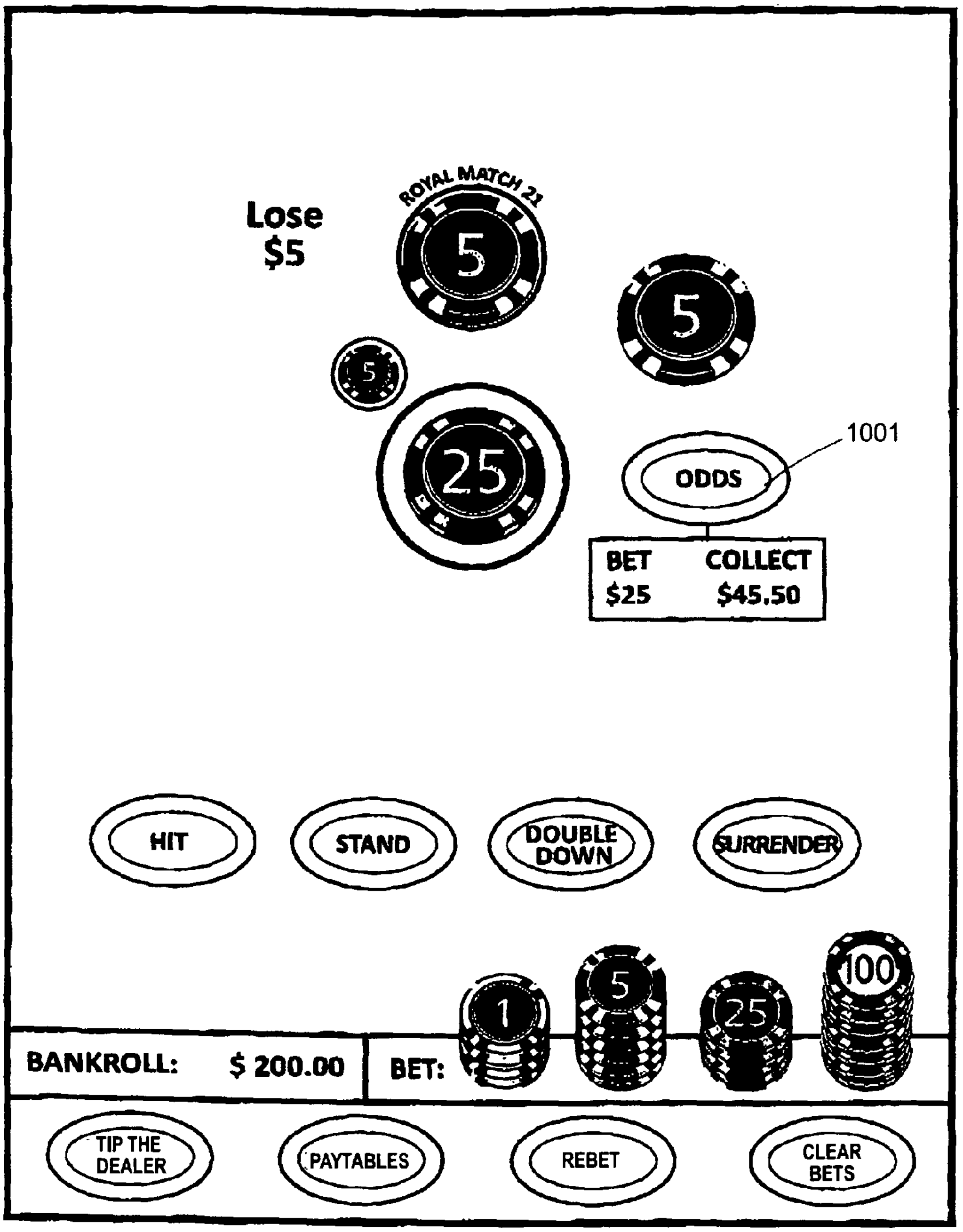
FIG. 21B shows various wagers made electronically and other optional wagers with respective payouts.

FIG. 21A shows a screen shot for a blackjack variant game with special wagers being made in area 901 in addition to the normal player versus dealer wager made in betting area 902 (shown here as $25.00). The wager shown as $5.00 is a special side-bet wager. FIG. 21B shows that an "odds" bet can be made in area 1001.

Figure 21C:
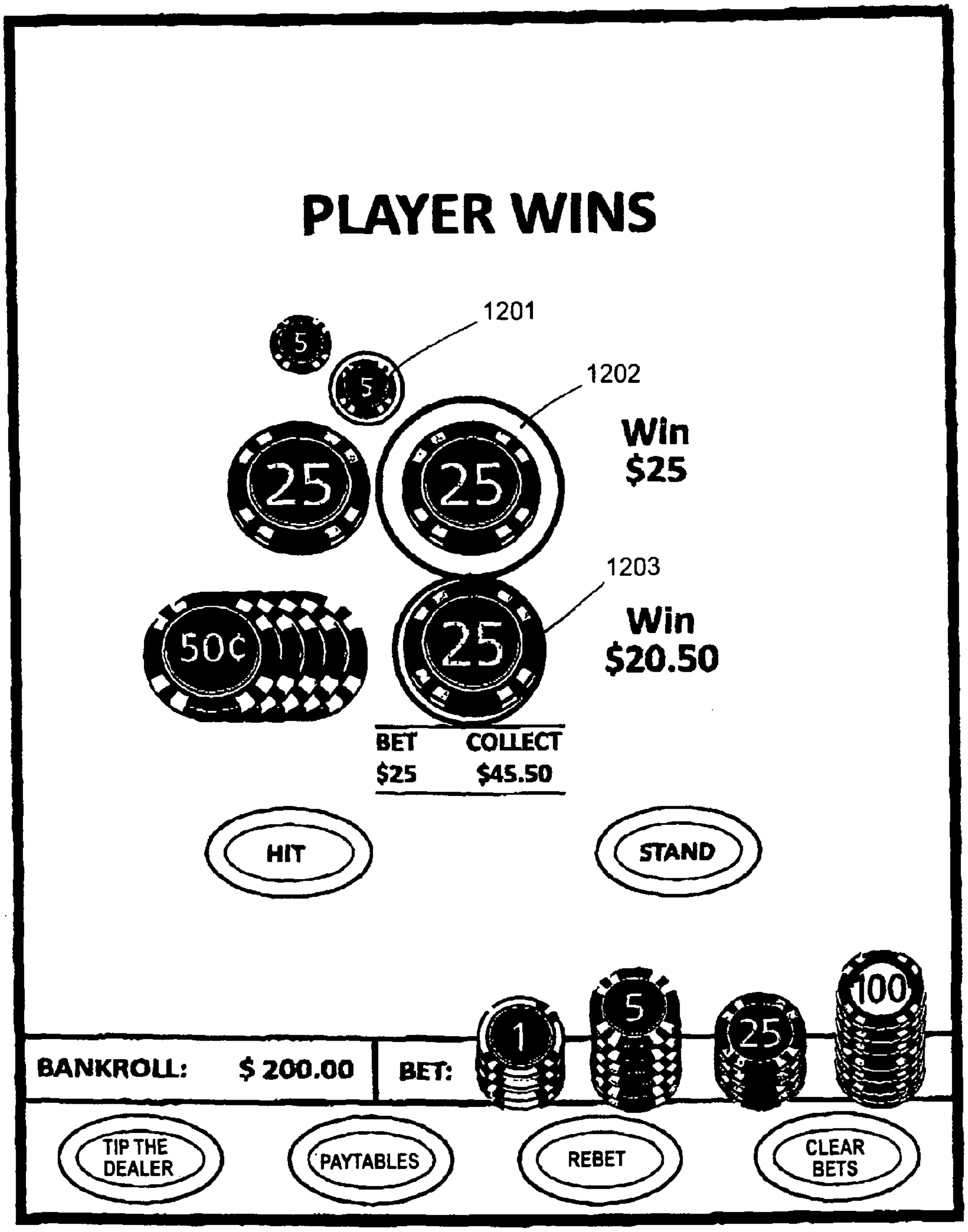
FIG. 21C shows respective payouts on a wager made on a base game as well as two simultaneously paid side-bet games.

FIG. 21C shows final results of play of a game based on wagers similar to those of FIG. 21B. In FIG. 21C, it is shown that a first $5.00 side wager made in area 1201 is paid at 1:1 odds, a play wager of $25.00 made in area 1202 is paid at 1:1 odds, and a unique side-bet wager made by a player in area 1203 after partial view of a player's hand is paid at statistical odds marginally different from 1:1. Partial-value virtual chips ($0.50) are not necessarily provided with individual stacking areas, but will eventually be credited to the bankroll balance.

Figure 22A:
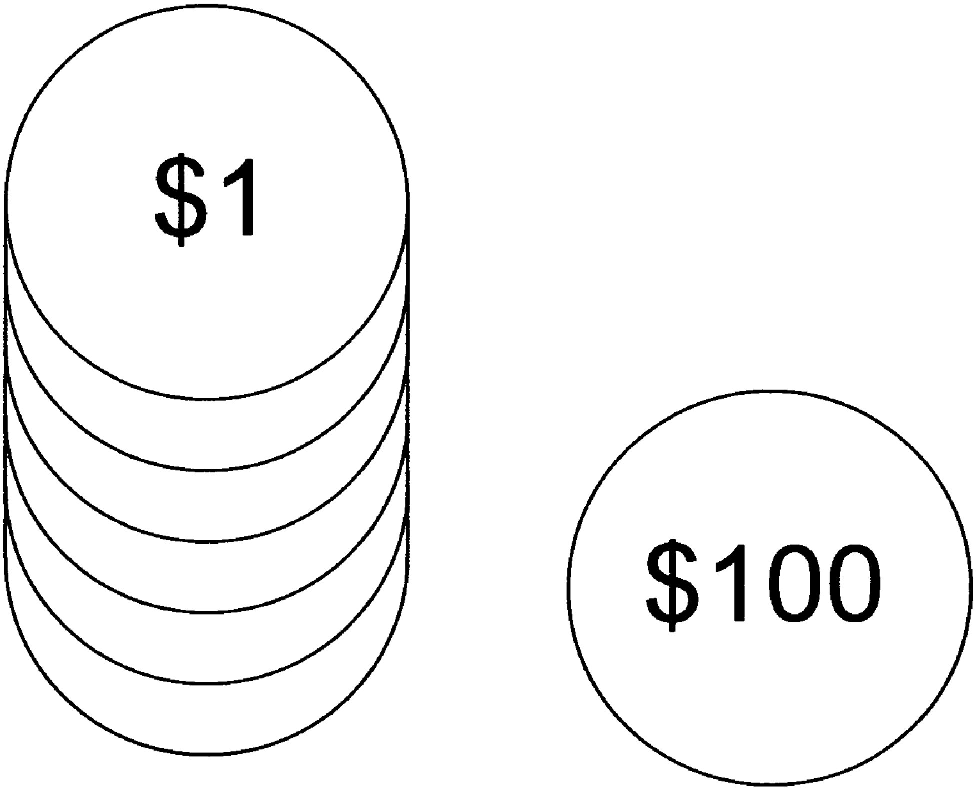
FIG. 22A illustrates two stacks of virtual chips, each having a separate denomination.
Figure 22B:
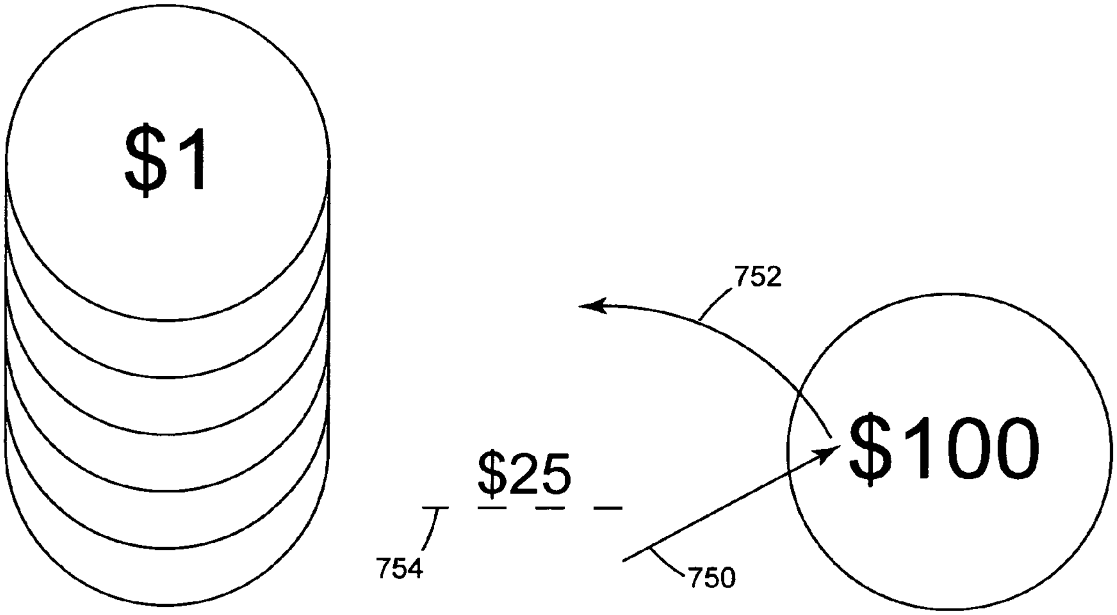
FIG. 22B illustrates a step of activating a process to exchange one high-denomination chip for multiple lower-denomination chips.
Figure 22C:
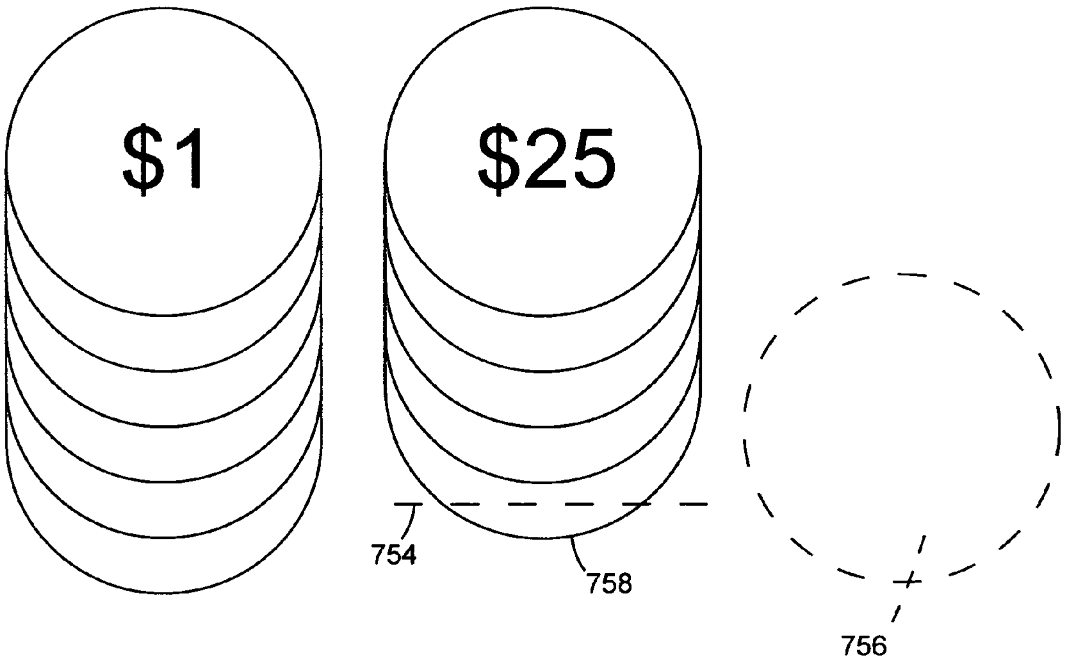
FIG. 22C shows an area for the high-denomination chip vacant, and another area populated with multiple lower-denomination chips.

FIGS. 22A, 22B and 22C show a sequence of screen images in which denominations of chips are changed from a higher denomination to a lower denomination by player action. In FIG. 22A, two initial stacks of 5×$1.00 chips and 1×$100.00 chips are shown. In FIG. 22B, the same set of chips are shown, with the $100.00 chip displaced and a location 754 created for stacking of $25.00 chips. A schematic player finger 750 (shown by arrow) contacts the single $100.00 virtual chip and drags it to the location 754 for the $25.00 chips along path 752 (shown by arrow). In FIG. 22C, a space 756 is shown vacant of any $100.00 chips and the previously vacant $25.00 chip location 754 now has 4×$25.00 chips 758, equivalent in value to the changed single $100.00 chip moved in FIG. 22B. The process may be repeated for converting one or more $25.00 chips to multiple $5.00 chips or combinations of $10.00, $5.00 and $1.00 chips (or odd value chips, such as $3.00 chips).

Rather than touching and dragging, as in FIG. 22B, the player's finger may tap the $100.00 chip and then tap the $25.00 location 754 and the same transaction and result will occur. This step can be repeated multiple times, for example, if there were four $100.00 virtual chips and the player wanted eight $25.00 virtual chips. This player controlled operation can be significantly advantageous as compared to repeated interruptions of the dealer's play of the game to exchange denominations of chips.

Increases in the denominations of chips may be similarly effected. If a player were to touch the $1.00 stack of chips in FIG. 22B and drag it to the right (or to any area designated as a $5.00 value area (not shown), the processor would read the movement of contact (by touch and drag or tap-tap method) from the $1.00 stack to a $5.00 chip position. In the event that there were sufficient chips to color up (increase the value of collections of chips), the processor would make the change in valuation and display the change on the screen.

The time savings in this system and methodology must be appreciated in light of the complexity and level of security that is imposed and performed on physical chip transactions. In a physical casino table game with physical chips, denominations of chips are moved by the player into an acceptable position. The dealer then collects the chips and places them in a first position, ordering the chips in specifically sized stacks (e.g., 20×$5.00 chips and 4×$25.00 chips and partial values of chips are spread out, for example). The dealer then moves a corresponding value of chips adjacent to the player's moved chip collection, but in a separate position from which amounts may be compared. The dealer then calls over a pit boss (higher ranking supervisory personnel) to witness and valuate the transaction. The supervisor then approves the transaction and the physical exchange of differing denominations of physical chips, and then the chips are exchanged. This is time consuming enough for single players, but with multiple players involved, this transaction can take five to ten minutes per table, which can cause a significant delay in game play, irritate fellow players, and decrease casino revenue. The use of the automated color-up system described herein can significantly reduce down time and delays.

There may also be provided an automatic maximum chip value function added, where a player activates this function and the highest value chips are displayed. For example, if the display showed 43×$25.00 virtual chips and 17×$5.00 virtual chips and 23×$1.00 chips, the automatic maximum color-up function would show 1×$1,000.00 chip, 1×$100.00 chip, 3×$25.00 chips, 1×$5.00 chips and 3×$1.00 chips. When the system is equipped with a ticket printer, these images can be printed on the ticket for additional visual confirmation of ticket value.

The term "virtual chip tray," as used herein, may refer to a physical image of adjacent troughs with chips of similar value lined up within the troughs or adjacent stacks of chips of similar value aligned on a player's virtual play or area of control surface.

The invention claimed is:

1. A system for monitoring the play of a wagering game, the system comprising:

a gaming table;

a game controller configured to administer a wagering game on the gaming table;

a plurality of player displays, wherein each player display of the plurality includes:

a player interface having a virtual chip tray field for displaying an arrangement of one or more virtual chips in virtual chip stacks representing unwagered player credit according to a corresponding value of the one or more virtual chips in the virtual chip stacks; and a processor programmed to manage the displayed arrangement of the one or more virtual chips in the virtual chip stacks, the processor further programmed to exchange a number of virtual chips from a first virtual chip stack with a different number of virtual chips of equivalent value to be displayed in a second virtual chip stack responsive to a player input received during game play without dealer intervention, the player input indicative of the exchange; and a dealer interface configured to communicate dealer inputs to the game controller during the wagering game.

2. The system of claim 1, further comprising a dealer touch screen interface configured to perform functions selected from the group consisting of a player buy in, a player cash out, enabling the player interface, disabling the player interface, transferring credits, a dealer log in, a dealer log out, notification of a dealer blackjack, and reconciliation of wagers.

3. The system of claim 1, further comprising a double-sided display in communication with the game controller, wherein the double-sided display is configured to display first information directed to players and second information directed to pit personnel.

4. The system of claim 3, wherein the first information directed to players is selected from the group consisting of a pay table, a game name, a casino name, a game logo, a casino logo, and a casino advertisement.

5. The system of claim 1, wherein the plurality of player displays are flush-mounted into a top surface of the gaming table.

6. The system of claim 1, wherein the gaming table has a fabric-covered upper surface, wherein the fabric-covered upper surface lacks game-specific markings.

7. The system of claim 1, wherein the player interface includes:

a first area for displaying game information to a player, wherein the virtual chip tray field is located within the first area; and a second area for displaying information to a dealer.

8. The system of claim 7, wherein at least some of the information displayed in the first area and the second area of the player interface is alphanumeric information.

9. The system of claim 1, wherein the virtual chip tray field has predetermined non-visible dimensions to limit the virtual chip stacks to include a predetermined number of virtual chips.

10. The system of claim 1, wherein the player interface further includes a bankroll field indicating a credit amount available for the player to wager.

11. The system of claim 10, wherein the processor is further programmed to automatically balance the displayed arrangement of the one or more virtual chips relative to the credit amount in the bankroll field.

12. The system of claim 10, wherein an overage amount is displayed in the bankroll field if the amount of the credit amount exceeds a maximum value displayed by the virtual chip stacks.

13. The system of claim 1, wherein the virtual chip tray field includes at least one miscellaneous virtual chip stack for credit overflow.

14. The system of claim 1, wherein a value of an individual virtual chip of the first virtual chip stack is a higher value than a value of an individual virtual chip of the second virtual chip stack, such that the number of virtual chips from the first virtual chip stack involved in the exchange is fewer than the different number of virtual chips of the second virtual chip stack involved in the exchange.

15. The system of claim 1, wherein a value of an individual virtual chip of the first virtual chip stack is a lower value than a value of an individual virtual chip of the second virtual chip stack, such that the number of virtual chips from the first virtual chip stack involved in the exchange is greater than the different number of virtual chips of the second virtual chip stack involved in the exchange.

16. The system of claim 1, wherein the processor is further programmed to execute the exchange responsive to the player input whenever at least one virtual chip stack is present regardless of whether or not there is active game play.

17. The system of claim 1, further comprising a card-reading device for reading at least the rank of a card prior to delivery to a player.

18. The system of claim 17, further comprising a card-handling device being integrated with the card-reading device, wherein the card-handling device is selected from the group consisting of a shoe and a shuffler.

19. The system of claim 17, wherein the card-reading device is selected from the group consisting of an overhead card-imaging device and a tabletop card-reading device.

20. The system of claim 18, wherein the player interface includes touch screen controls enabling wager inputs by the player.

21. The system of claim 1, wherein the player interface includes a touch screen interface, and wherein the player input is selected from the group consisting of a tap action on the touch screen interface from a player and a drag and drop action on the touch screen interface from a player.

22. The system of claim 1, wherein the player interface includes a player input control configured to designate denominations for the value of the chips in the virtual chip stacks.

* * * * *

UNITED STATES PATENT AND TRADEMARK OFFICE

CERTIFICATE OF CORRECTION

PATENT NO. : 8,251,801 B2
APPLICATION NO. : 12/231759
DATED : August 28, 2012
INVENTOR(S) : Nathan J. Wadds et al.

It is certified that error appears in the above-identified patent and that said Letters Patent is hereby corrected as shown below:

In the specification:

| | | |
|---|---|---|
| COLUMN 10, | LINE 35, | change “as a “hit”.” to --as a “hit.”-- |
| COLUMN 14, | LINE 37, | change “memory, (NVM),” to --memory (NVM),-- |
| COLUMN 19, | LINE 42, | change “Game-Specific” to --Game-specific-- |
| COLUMN 27, | LINES 47-48, | change ““chip conversion”” to --chip conversion-- |

Signed and Sealed this
Twenty-ninth Day of September, 2015

Michelle K. Lee
*Director of the United States Patent and Trademark Office*